United States Patent
Yu et al.

(10) Patent No.: US 11,076,037 B2
(45) Date of Patent: Jul. 27, 2021

(54) ELECTRONIC DEVICE FOR SYNCHRONIZING MODIFICATION AMONG SCREENS AND OPERATION METHOD THEREOF

(71) Applicant: Samsung Electronics Co., Ltd., Suwon-si (KR)

(72) Inventors: Hyemi Yu, Suwon-si (KR); Daewon Kim, Suwon-si (KR); Junu Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/922,403

(22) Filed: Jul. 7, 2020

(65) Prior Publication Data

US 2021/0105356 A1    Apr. 8, 2021

(30) Foreign Application Priority Data

Oct. 4, 2019    (KR) .................... 10-2019-0123308

(51) Int. Cl.
  *G06F 3/0488*    (2013.01)
  *H04M 1/72427*    (2021.01)
  (Continued)

(52) U.S. Cl.
  CPC ........ *H04M 1/72427* (2021.01); *G06F 3/017* (2013.01); *G06F 3/0482* (2013.01); *G06F 3/04845* (2013.01); *G06F 3/04886* (2013.01)

(58) Field of Classification Search
  CPC .. H04M 1/72427; G06F 3/017; G06F 3/0482; G06F 3/04845; G06F 3/04886
  See application file for complete search history.

(56) References Cited

U.S. PATENT DOCUMENTS 9,064,448 B1    6/2015  Padgett
9,189,917 B2 *  11/2015 Anderson ........... G07F 17/3209
(Continued)

FOREIGN PATENT DOCUMENTS

KR        10-1741906 B1      5/2017
KR     10-2017-0088094 A     8/2017
WO        2016/167406 A1    10/2016

OTHER PUBLICATIONS

[Settings] Editing smartphone home screens/creating new folders/placing applications inside new folders/changing the home screen and lock screen, Sep. 29, 2016.
(Continued)

*Primary Examiner* — Shen Shiau
(74) *Attorney, Agent, or Firm* — Jefferson IP Law, LLP

(57) ABSTRACT

A method of synchronizing a modification among displayed screens and an electronic device are provided. The electronic device includes a first display, a memory to store instructions, and at least one processor coupled to the memory. The instructions, which, when executed, configure the at least one processor to control the first display to display a preview image of each of a plurality of screens including a first screen, receive a first user input for modifying a background image of the first screen in an area in which the preview image corresponding to the first screen is displayed, modify a background image of each of the plurality of screens by synchronizing a modification corresponding to the first user input among background images of the plurality of screens, and control the first display to display the preview image of each of the plurality of screens including the modified background image.

20 Claims, 21 Drawing Sheets

(51) Int. Cl.
*G06F 3/01* (2006.01)
*G06F 3/0484* (2013.01)
*G06F 3/0482* (2013.01)

(56) References Cited

U.S. PATENT DOCUMENTS

| | | | |
|---|---|---|---|
| 9,417,784 B2 | 8/2016 | Kwak et al. | |
| 9,606,723 B2 | 3/2017 | Selim | |
| 10,430,148 B2* | 10/2019 | Choi | G06F 3/1454 |
| 2009/0103144 A1* | 4/2009 | Kim | H04N 1/0044 |
| | | | 358/474 |
| 2010/0257469 A1* | 10/2010 | Kim | G06F 9/451 |
| | | | 715/763 |
| 2011/0218042 A1* | 9/2011 | Anderson | G07F 17/323 |
| | | | 463/31 |
| 2013/0038627 A1* | 2/2013 | Mujkic | G06F 9/451 |
| | | | 345/619 |
| 2013/0305189 A1* | 11/2013 | Kim | G06F 3/0482 |
| | | | 715/838 |
| 2016/0098240 A1* | 4/2016 | Hong | G06F 3/1446 |
| | | | 345/1.3 |
| 2016/0140103 A1 | 5/2016 | Yang | |
| 2017/0099602 A1* | 4/2017 | Joo | H04L 63/083 |
| 2017/0109029 A1* | 4/2017 | Lee | G09G 5/06 |
| 2018/0101352 A1 | 4/2018 | Choi | |

OTHER PUBLICATIONS

Gongyugsa. 'How to change the Galaxy wallpaper (SAMSUNG)'; gong-yugsa seonbulpon, naver blog [online]. Apr. 3, 2019 [retrived on Sep. 10, 2020]. Retrived from the Internet: <URL: https://blog.naver.com/PostView.nhn?blogId=s8211 ;s&logNo=221504744106&parentCategoryNo=&;categoryNo=1&viewDate=&isShowPopularPosts=true&from=search>. pp. 1-13; Apr. 3, 2019.
International Search Report dated Sep. 28, 2020, issued in International Application No. PCT/KR2020/008276.

* cited by examiner

ELECTRONIC DEVICE FOR SYNCHRONIZING MODIFICATION AMONG SCREENS AND OPERATION METHOD THEREOF

CROSS-REFERENCE TO RELATED APPLICATION(S)

This application is based on and claims priority under 35 U.S.C. § 119 of a Korean patent application number 10-2019-0123308, filed on Oct. 4, 2019, in the Korean Intellectual Property Office, the disclosure of which is incorporated by reference herein in its entirety.

BACKGROUND

1. Field

The disclosure relates to an electronic device and an operation method thereof. More particularly, the disclosure relates to a technology of synchronizing a modification among screens displayed in an electronic device.

2. Description of Related Art

Various electronic devices, such as a smart phone, a table personal computer (PC), a portable multimedia player (PMP), a personal digital assistant (PDA), a laptop personal computer (laptop PC), and a wearable device, and the like, have come to be popular.

An electronic device may display various screens on a display. A screen is generated by an application, and may include a background image and various visual elements (e.g., an icon, widget, text, still image, or video corresponding to an application or function) displayed in the background image. For example, a screen may be a home screen including visual elements or a lock screen displayed during a predetermined period of time, in a screen-locked state.

An electronic device may provide a function of modifying a screen according to the individuality of a user. A user of an electronic device may change a background image in a screen, may change the size of a background image in a screen, or may add or delete various visual elements included in a screen or change the disposition thereof.

The above information is presented as background information only to assist with an understanding of the disclosure. No determination has been made, and no assertion is made, as to whether any of the above might be applicable as prior art with regard to the disclosure.

SUMMARY

An electronic device may provide a function of modifying various screens. However, in order to modify a plurality of screens, the electronic device may need to receive user input for modification for each of the plurality of screens.

If the number of screens to be modified increases, the number of times that user input is required increases. Accordingly, there may be an inconvenience for a user who desires to modify a screen.

Aspects of the disclosure are to address at least the above-mentioned problems and/or disadvantages and to provide at least the advantages described below. Accordingly, an aspect of the disclosure is to provide an apparatus and method for synchronizing a modification among displayed screens.

Additional aspects will be set forth in part in the description which follows and, in part, will be apparent from the description, or may be learned by practice of the presented embodiments.

In accordance with an aspect of the disclosure, an electronic device is provided. The electronic device includes a first display, a memory to store instructions, and at least one processor coupled to the memory, wherein, the instructions, which, when executed, configure the at least one processor to control the first display so as to display the preview image of each of a plurality of screens including a first screen, receive first user input for modifying the background image of the first screen in an area in which the preview image corresponding to the first screen is displayed, modify the background image of each of the plurality of screens by synchronizing a modification corresponding to the first user input among the background images of the plurality of screens, and control the first display so as to display the preview image of each of the plurality of screens including the modified background image of each of the plurality of screens.

In accordance with another aspect of the disclosure, a method (e.g., operation method) of an electronic device is provided. The method includes displaying, on a first display, the preview image of each of a plurality of screens including a first screen, receiving a first user input for modifying the background image of the first screen, modifying the background image of each of the plurality of screens by synchronizing a modification corresponding to the first user input among the background images of the plurality of screens, and displaying, on the first display, the preview image of each of the plurality of screens including the modified background image of each of the plurality of screens.

An electronic device and an operation method thereof according to various embodiments may receive user input in one of the preview images of a plurality of screens and apply a modification corresponding to the user input to the plurality of screens by synchronizing the modification among the plurality of screens. Therefore, the amount of user input required to modify the plurality of screens may be reduced, and thus usability for a user who desires to modify the plurality of screens may be improved.

An electronic device and an operation method thereof according to various embodiments may additionally modify a background image in a screen based on the type or characteristics of a visual element included in each of a plurality of screens. Therefore, deterioration in visibility of a visual element, which may be caused by modification performed simultaneously without taking into consideration the characteristics of each of the plurality of screens, may be prevented.

An electronic device and an operation method thereof according to various embodiments may additionally modify a background image in a screen based on the type of application that provides each of a plurality of screens. Therefore, deterioration in the visibility of content in a screen, which may be caused by simultaneous modification without taking into consideration the characteristics of each of the plurality of screens, may be prevented.

Other aspects, advantages, and salient features of the disclosure will become apparent to those skilled in the art from the following detailed description, which, taken in conjunction with the annexed drawings, discloses various embodiments of the disclosure

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
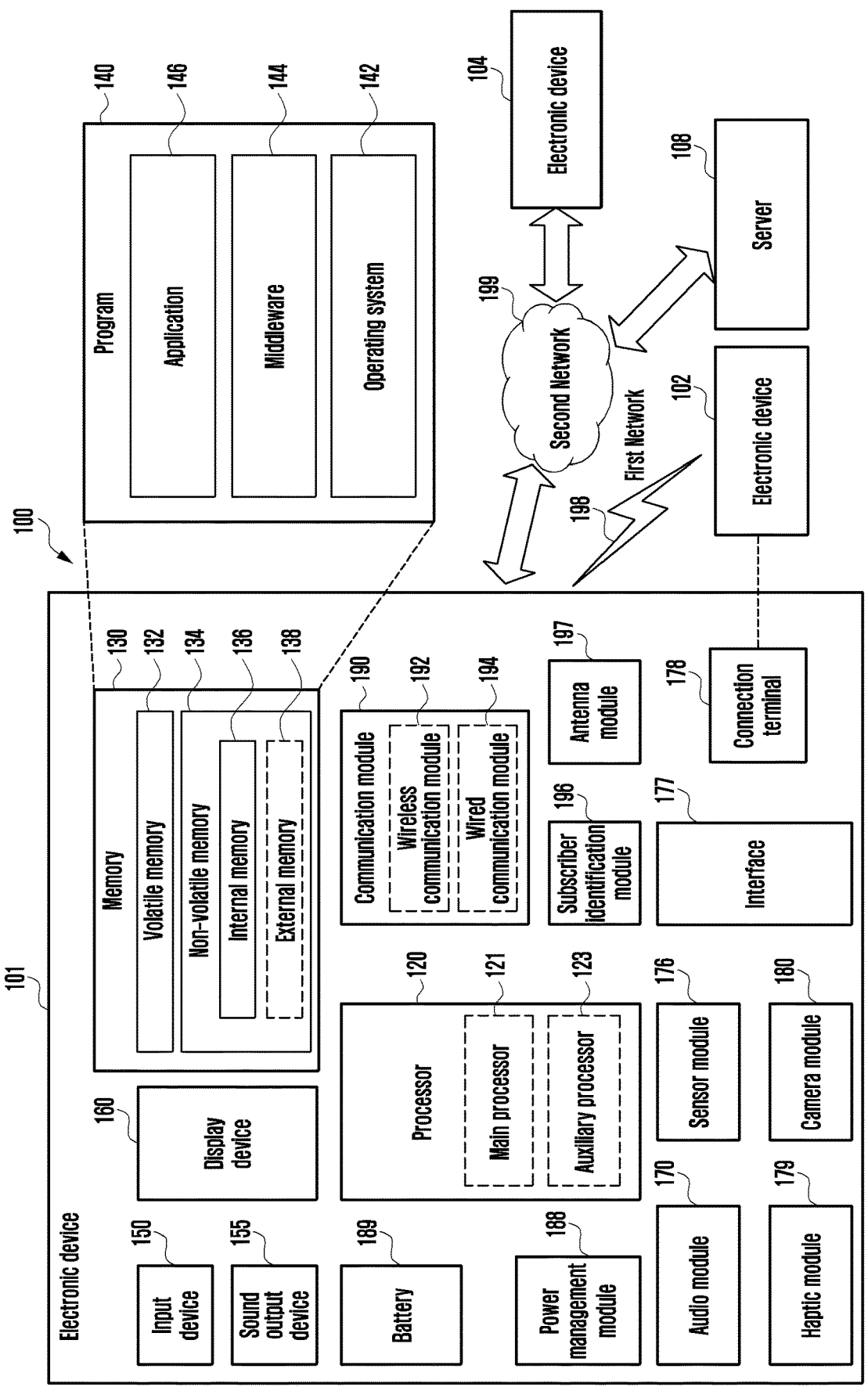
FIG. 1 is a block diagram of an electronic device according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
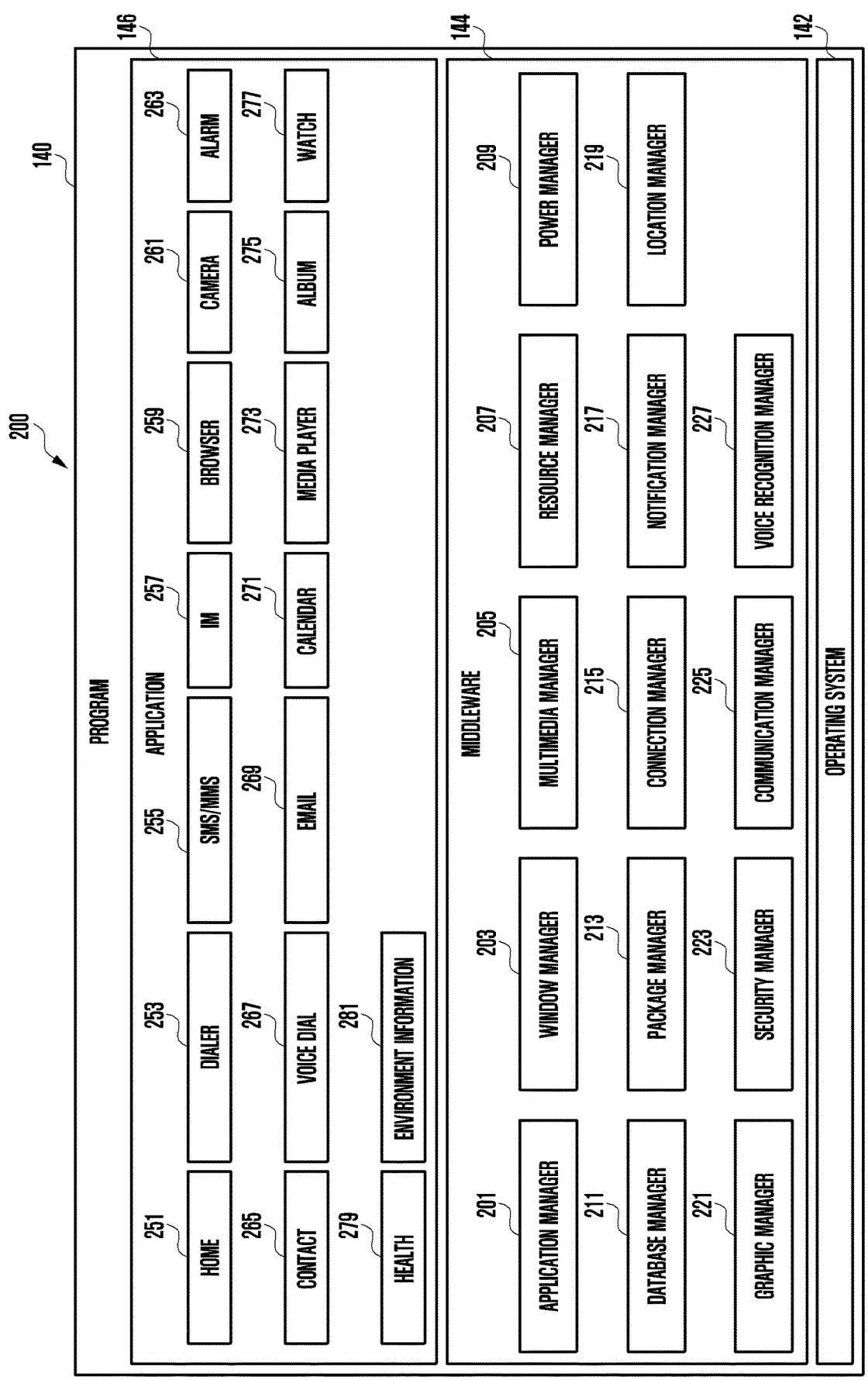
FIG. 2 is a block diagram of a program according to an embodiment of the disclosure.

FIG. 2 is a block diagram 200 illustrating the program 140 according to an embodiment of the disclosure.

Referring to FIG. 2, according to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
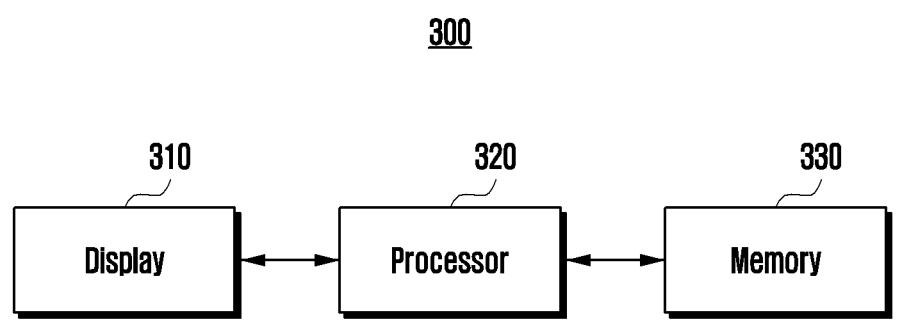
FIG. 3 is a block diagram of an electronic device according to an embodiment of the disclosure.

FIG. 3 is a block diagram of an electronic device according to an embodiment of the disclosure.

Referring to FIG. 3, an electronic device 300 (e.g., the electronic device 101 of FIG. 1) according to various embodiments may include a display 310 (e.g., the display device 160 of FIG. 1), a processor 320 (e.g., the processor 120 of FIG. 1), and a memory 330 (e.g., the memory 130 of FIG. 1).

According to various embodiments, the display 310 may display various still images or videos under the control of the processor 320. The display 310 may display a plurality of screens. A screen is a unit of a screen displayed on the display 310, and may be a screen provided by an application that is running A screen may include a background image and various visual elements (e.g., an icon, widget, text, still image, video corresponding to an application or function) displayed in the background image. For example, a screen may be one of various types of screens, including a home screen that includes visual elements, a lock screen displayed during a predetermined period of time in a screen-locked state, a screen displayed while a foreground application is running, or a screen displayed on a display provided by an external electronic device.

According to various embodiments, the memory 330 is operatively connected to the processor 320, and may store instructions for operating the processor 320. The memory 330 may store various images displayed on the display 310. An image selected from the images stored in the memory 330 may be set as the background image of a screen.

According to various embodiments, the processor 320 may implement various operations using instructions stored in the memory 330.

According to various embodiments, the processor 320 may provide a function of modifying a plurality of screens using an application for modifying a plurality of screens. The processor 320 may display the preview images of a plurality of screens (e.g., a home screen or a lock screen), including a first screen, on the display 310 in order to modify the plurality of screens. A preview image may be an image obtained by rendering a screen to be modified by user input, and a user may identify a modification made in the displayed preview image.

According to various embodiments, the processor 320 may receive user input for modifying the first screen among the plurality of screens. The user input may be user input applied to the preview image corresponding to the first screen. According to an embodiment, the user input may be user input for modifying a background image included in the first screen. The user input may be user input for designating an area to be displayed in an original image corresponding to the background image. The user input may be user input for changing the area to be displayed by performing drag input to the area to be displayed. According to various embodiments, the user input may be user input of performing zooming in or zooming out in order to enlarge or reduce the area to be displayed. In addition to the example provided above, the processor 320 may modify the background image included in the first screen based on various kinds of user input.

According to various embodiments, the processor 320 may apply a modification corresponding to user input to a background image so as to modify the background image included in the first screen. The modified background image may be stored in the memory 330.

According to various embodiments, the processor 320 may modify a background image included in each of the plurality of screens based on user input. The processor 320 may modify the background images by synchronizing a modification corresponding to user input among the background images of the plurality of screens so that the modification is applied.

According to various embodiments, the processor 320 may receive user input, and may copy input data corresponding to the user input. The processor 320 may modify background images respectively included in the plurality of screens using the copied input data. For example, the processor 320 may modify the background images respectively included in the plurality of screens by applying the copied input data to the plurality of screens. Via the above-described scheme, the background images of the plurality of screens may be modified based on user input performed on the first screen.

According to other embodiments, the processor 320 may temporarily store, in the memory 330, modification data including a modification corresponding to user input (e.g., information associated with an area in a background to be displayed), and may modify background images respectively included in the plurality of screens based on the temporarily stored modification data. The processor 320 may modify the background images by modifying the background images respectively included in the plurality of screens based on the modification data.

According to various embodiments, the processor 320 may control the display 310 so as to display the preview images of the plurality of screens that include modified background images.

According to various embodiments, in the state in which the preview images of the plurality of previous screens, including the background images, which are not modified yet, are displayed, the processor 320 may display a preview image of the first screen, which is modified based on user input, and preview images of screens other than the first screen, which are modified based on copied user input, in response to reception of the user input for modifying the first screen.

According to a comparative example in which a function of synchronizing a modification in a single screen (e.g., the first screen) among the single screen and other screens is not implemented, the electronic device 300 may display the preview image of the first screen modified based on user input and preview images of other screens which are not modified, in response to reception of the user input for modifying the first screen, in the state in which the preview images of the plurality of screens are displayed. According to the comparative example, in order to modify the plurality of screens, user input may need to be performed a number of times equal to the number of screens to be modified, whereby usability for a user with respect to customizing screens may be decreased. According to various embodiments of the disclosure in which a function of synchronizing a modification made in a single screen (e.g., the first screen) among the single screen and other screens is implemented, a plurality of screens may be modified based on a single user input for modifying the first screen, and the usability for a user with respect to customizing screens may be increased.

According to various embodiments, the processor 320 may receive user input for selecting at least one application in order to set a background image thereof. The application to be selected may be an application of which the background image is already set, and may be selected in order to modify the background image.

According to various embodiments, the processor 320 may display the preview image of at least one screen to be displayed when the selected application runs. The processor 320 may receive user input on the preview image of the first screen, and may apply a modification corresponding to the user input to the plurality of screens. As described above, the electronic device 300 may support modification of the background images of screens displayed when the various applications installed in the electronic device 300 are activated.

When the modification made in the first screen is simultaneously applied to the background images of the other screens, the visibility of visual elements included in each screen may deteriorate. According to various embodiments, the processor 320 may identify the type (e.g., text or image) or the characteristics (e.g., color or chroma) of a visual element included in a second screen among the plurality of screens.

According to various embodiments, the processor 320 may additionally modify a background image by modifying at least a part of the background image of the second screen which corresponds to an area in which a visual element is disposed, based on the type or characteristics of the visual element. For example, the processor 320 may identify that a visual element includes content (e.g., text) that a user needs to check, based on the characteristics of the visual element, and the processor 320 may modify an area in which the visual element is disposed to have a lower chroma or a higher brightness than other areas. According to another example, the processor 320 may identify that a visual element includes content (e.g., an image) that a user needs to check relatively seldom, based on the characteristics of the visual element, and the processor 320 may modify an area in which the visual element is disposed to have a lower chroma or a lower brightness than other areas.

According to various embodiments, the processor 320 may additionally modify a background image based on the type of application corresponding to the screen to be modified. The processor 320 may identify whether an application includes a lot of main content that a user needs to check (e.g., a text message application or a social networking service (SNS) application) based on the type of application. The processor 320 may modify the background image corresponding to the second screen to be modified so as to have a lower chroma or a higher brightness than the background images of other screens upon identifying that the application that provides a screen to be modified provides content (e.g., text) that a user needs to check. The processor 320 may modify a background image corresponding to a screen to be modified so as to have a higher chroma or a lower brightness than the background images corresponding to the other screens, in response to identifying that an application corresponding to a screen to be modified is an application including a relatively small amount of content (e.g., text) that a user needs to check.

According to the above-mentioned embodiment, it has been described that the electronic device 300 modifies the background images of screens displayed on a single display 310. However, the disclosure may also be applied to an embodiment that modifies the background image of a screen to be displayed in another display in the electronic device (e.g., a foldable electronic device) equipped with a plurality of displays, and modifies the background image of a screen displayed in an external electronic device equipped with a display.

According to various embodiments, in response to reception of user input for modifying the first screen, the processor 320 may generate and modify the background image of a third screen to be displayed on a second display (not illustrated) among the plurality of screens by applying a modification corresponding to the user input performed on the first screen. The processor 320 may generate and modify the background image of the third screen based on the user input for modifying the background image of the first screen and the characteristics of the second display (e.g., the aspect ratio of the second display and the resolution of the second display). In order to overcome a problem that may occur when the aspect ratio of the second display and the aspect ratio of the display 310 are different from each other, the processor 320 may generate a background image which has the same ratio as the aspect ratio of the second display by adding or removing a part of the background image of the first screen. In order to overcome a problem occurring when the second display fails to support the resolution of the background image of the first screen, the processor 320 may change the resolution of the first screen (e.g., if the resolution of the second display is higher than the resolution of the background image of the first screen, the first screen may be scaled up, or if the resolution of the second display is lower than the resolution of the background image of the first screen, the first screen may be scaled down), so as to generate a background image having a resolution that the second display is capable of supporting.

According to various embodiments, the second display may be a display that is disposed in the electronic device 300, or is disposed in an external electronic device (e.g., the electronic device 102 of FIG. 1 or the electronic device 104 of FIG. 1) connected to the electronic device, and may be a display different from the display 310.

Figure 4A:
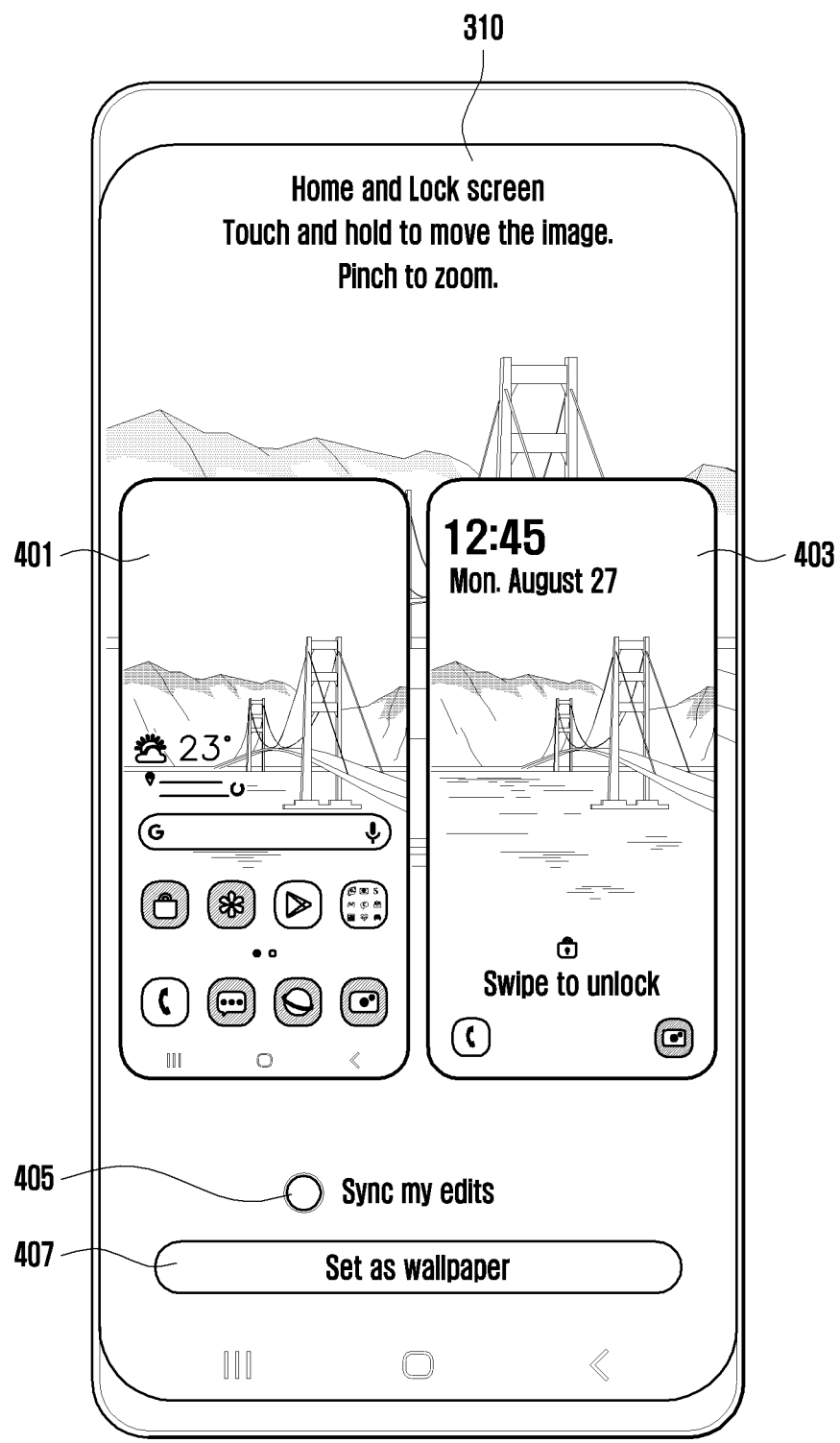
FIG. 4A is a diagram illustrating a screen for modifying a plurality of screens in an electronic device according to an embodiment of the disclosure.

FIG. 4A is a diagram illustrating a screen for modifying a plurality of screens in an electronic device according to an embodiment of the disclosure.

Figure 4B:
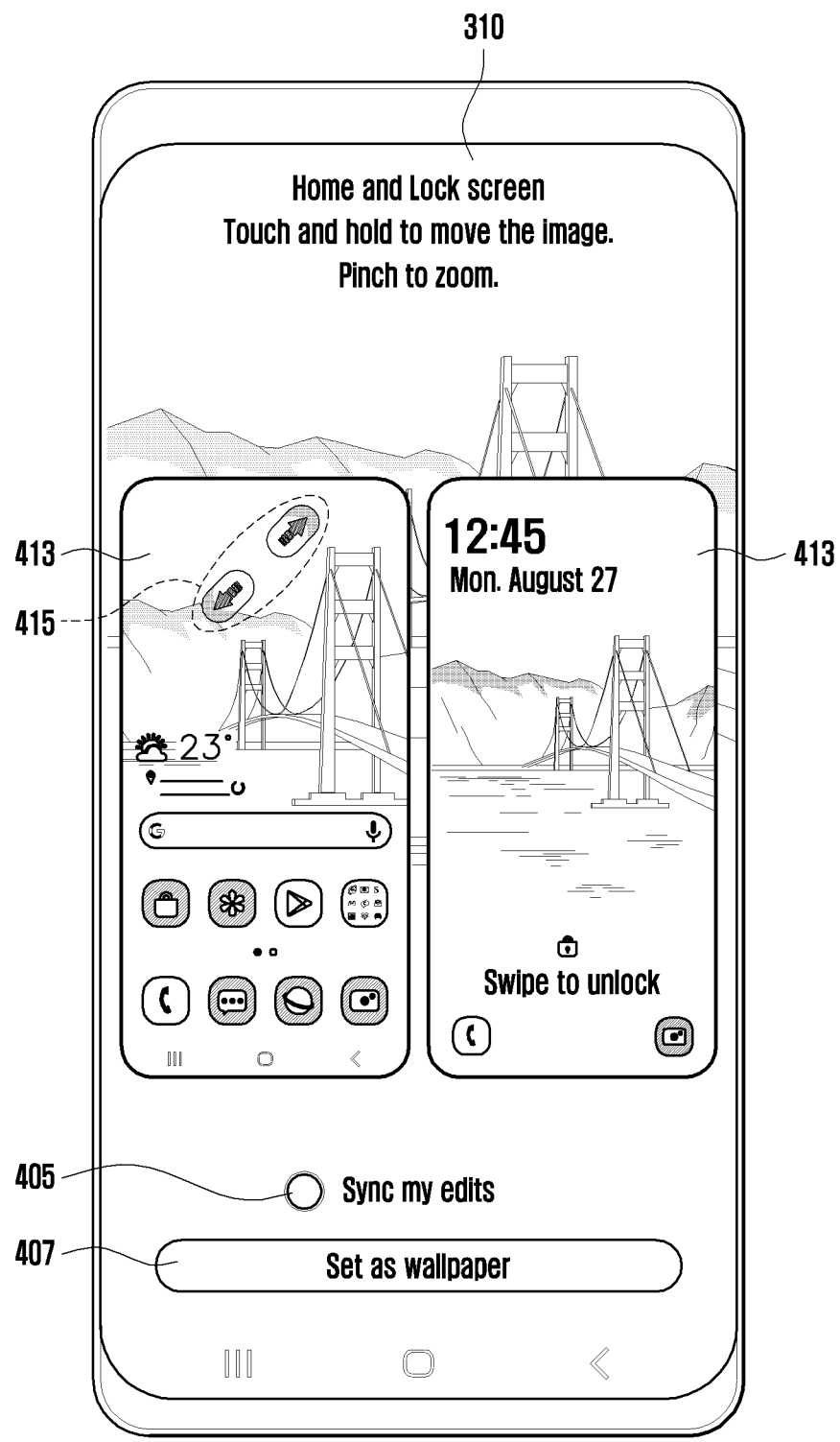
FIG. 4B is a screen for modifying a plurality of screens in an electronic device according to an embodiment of the disclosure.

FIG. 4B is a screen for modifying a plurality of screens in an electronic device according to an embodiment of the disclosure.

Figure 4C:
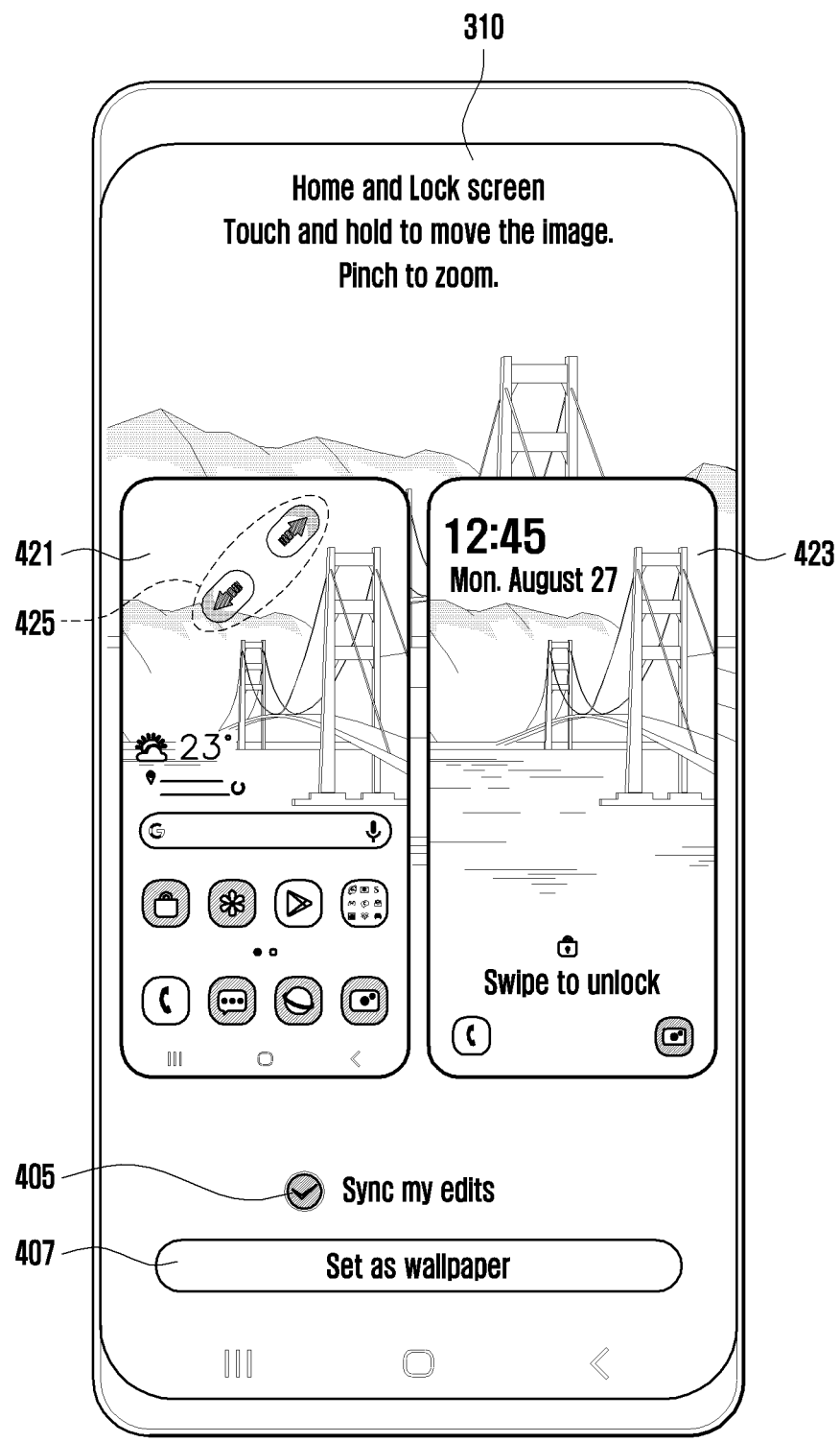
FIG. 4C is a screen for modifying a plurality of screens in an electronic device according to an embodiment of the disclosure.

FIG. 4C is a screen for modifying a plurality of screens in an electronic device according to embodiment of the disclosure.

Referring to FIG. 4A, the electronic device (e.g., the electronic device 300 of FIG. 3) may provide a function of modifying a plurality of screens using an application for modifying a plurality of screens. The electronic device 300 may display, on a display (e.g., the display 310 of FIG. 3), a screen including a first preview image 401 corresponding to a first screen and a second preview image 403 corresponding to a second screen in order to modify a plurality of screens, a button 405 for selecting whether to activate a function of performing synchronization so as to apply a modification corresponding to user input to a plurality of screens, and a button 407 for applying a modification.

According to various embodiments, the electronic device 300 may apply a modification made in the first preview image 401 to the second preview image 403 upon identifying that the button 405 for selecting whether to activate the function of performing synchronization so as to apply a modification corresponding to user input to a plurality of screens is selected. According to various embodiments, the electronic device 300 may not apply the modification made in the first preview image 401 to the second preview image 403, upon identifying that the button 405 for selecting whether to activate the function of performing synchronization so as to apply a modification corresponding to user input to a plurality of screens is not selected.

Referring to FIG. 4B, the electronic device 300 may receive user input 415 for modifying the background image of the first screen on the first preview image 401 corresponding to the first screen.

According to various embodiments, the electronic device 300 may apply a modification corresponding to the user input 415 to the background image of the first screen so as to modify the background image included in the first screen. The modified background image may be stored in the memory 330.

According to various embodiments, the electronic device 300 may display a preview image 421 of the first screen, which includes the modified background image, on the display 310.

According to various embodiments, the electronic device 300 may not apply the modification made in the first preview image 421 to the second preview image 413 upon identifying that the button 405 for selecting whether to activate the function of performing synchronization so as to apply a modification corresponding to user input to a plurality of screens is not selected.

Referring to FIG. 4C, the electronic device 300 may receive user input 425 for modifying the background image of the first screen on the first preview image 421 corresponding to the first screen.

According to various embodiments, the electronic device 300 may apply a modification corresponding to the user input 425 to the background image of the first screen so as to modify the background image included in the first screen. The modified background image may be stored in the memory 330.

According to various embodiments, the electronic device 300 may display a preview image 421 of the first screen including the modified background image on the display 310.

According to various embodiments, the electronic device 300 may apply a modification made in the first preview image 421 to the second preview image 423 upon identifying that the button 405 for selecting whether to activate the function of performing synchronization so as to apply a modification corresponding to user input to a plurality of screens is selected.

According to various embodiments, in the state in which the function of synchronizing a modification among a plurality of screens is deactivated, the electronic device 300 may modify the background image of the first screen based on user input performed on the first preview image 421. In this instance, the background images of the other screens excluding the first screen may be in an unmodified state. The electronic device 300 may apply the modification made in the first preview image 421 to a plurality of screens upon identifying that the button 405 for selecting whether to activate the function of performing synchronization so as to apply a modification corresponding to user input to a plurality of screens is selected.

According to various embodiments, the electronic device 300 may modify the background images of the first screen and the second screen based on the user input performed on the first preview image 421. The electronic device 300 may modify the background images by synchronizing the modification corresponding to the user input among the background images of the plurality of screens so that the modification is applied.

According to various embodiments, the electronic device 300 may receive the user input 425 and may copy input data corresponding to the user input 425. The electronic device 300 may modify the background images of the first screen and the second screen using the copied input data. For example, the processor 320 may modify the background images respectively included in the plurality of screens by applying the copied input data to the plurality of screens.

According to the above-described scheme, the background image of the second screen may be modified based on the user input performed on the first preview image 421.

According to various embodiments, the electronic device 300 may display the first preview image 421 and a second preview image 423, which include the modified background images, on the display 310.

Although the above-mentioned embodiment illustrates an embodiment in which a background image is modified based on user input performed on the first preview image 421, the electronic device 300 may modify the background image of the first screen corresponding to the first preview image 421 and the background image of the second screen corresponding to the second preview image 423 based on user input performed on the second preview image 423.

According to various embodiments, the electronic device 300 may receive user input for modifying the background image of the second screen corresponding to the second preview image 423 on the second preview image 423. The electronic device 300 may modify the background images of the first screen and the second screen based on the user input performed on the second preview image 423. The electronic device 300 may modify the background images by synchronizing the modification corresponding to the user input among the background images of the plurality of screens so that the modification is applied.

According to various embodiments of the disclosure of the function of synchronizing a modification made in a single screen (e.g., the first screen) between the single screen and another screen (e.g., the second screen), a plurality of screens may be modified based on a single user input for modifying the first screen, whereby usability for a user with respect to customizing screens may be increased.

Figure 5A:
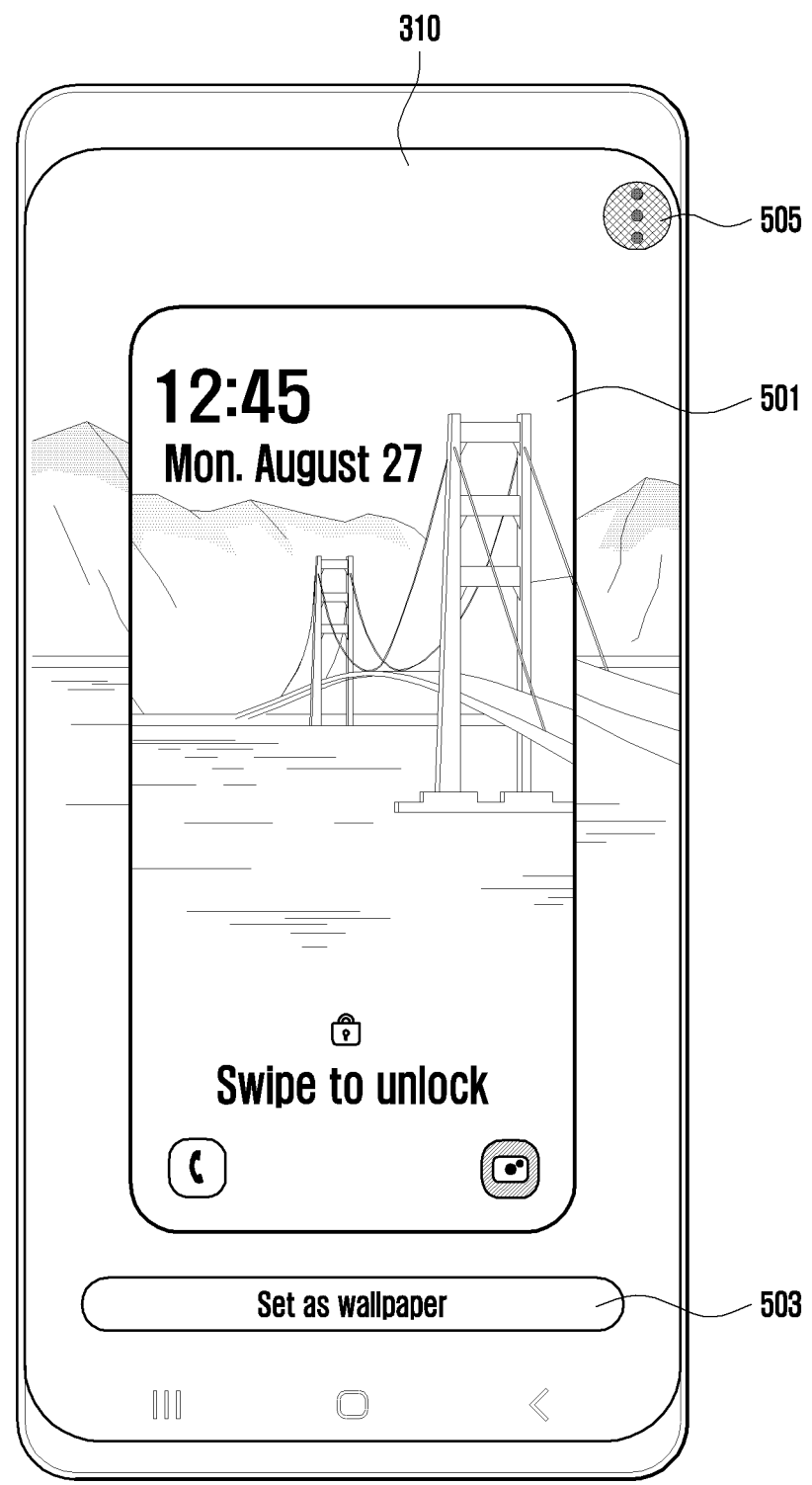
FIG. 5A is a diagram illustrating a screen for selecting applications of which the background images need to be edited and modifying a plurality of screens in an electronic device according to an embodiment of the disclosure.

FIG. 5A is a diagram illustrating a screen for selecting applications of which the background images need to be edited and modifying a plurality of screens in an electronic device according to an embodiment of the disclosure.

Figure 5B:
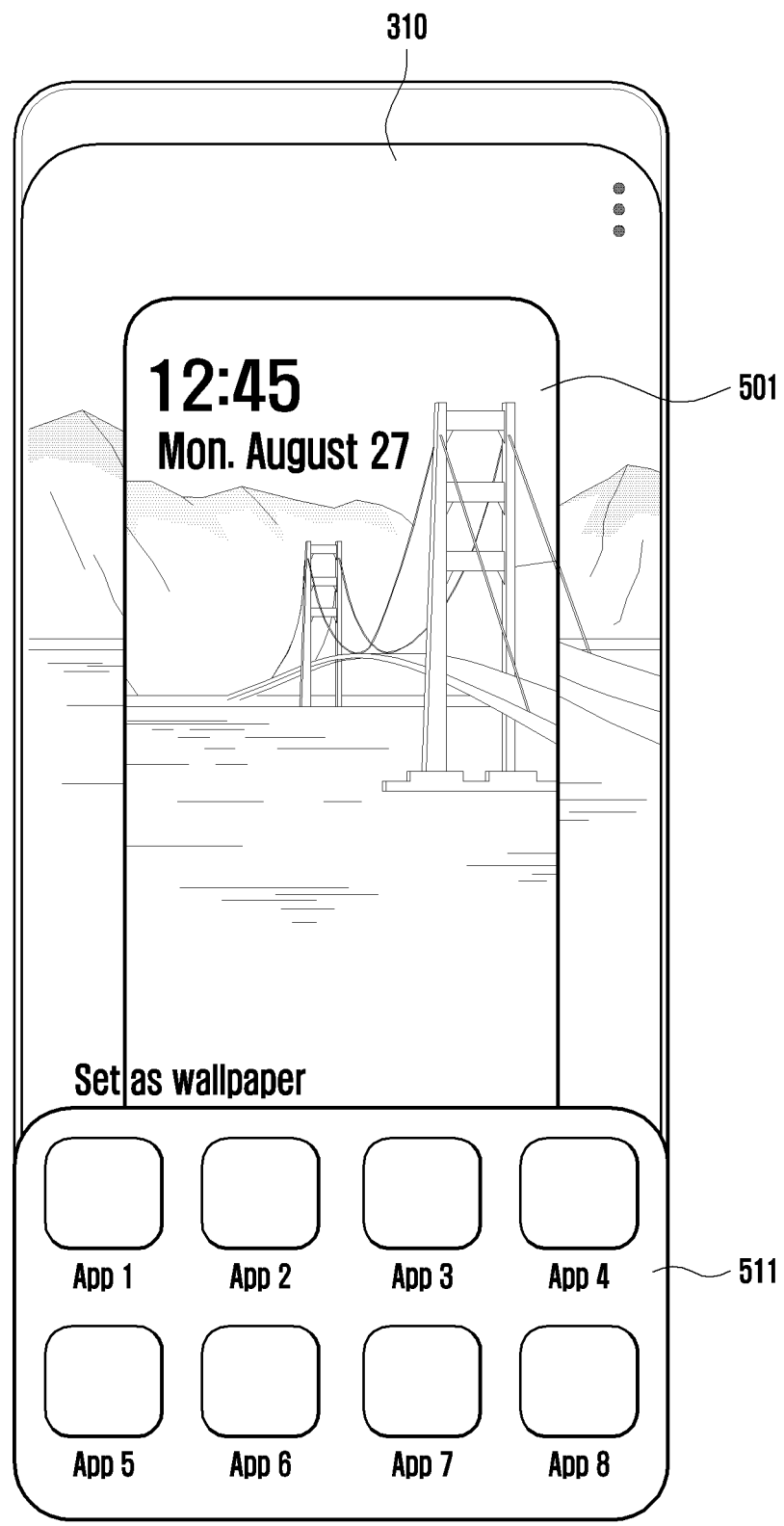
FIG. 5B is a diagram illustrating a screen for selecting applications of which the background images need to be edited, and modifying a plurality of screens in an electronic device according to an embodiment of the disclosure.

FIG. 5B is a diagram illustrating a screen for selecting applications of which the background images need to be edited and modifying a plurality of screens in an electronic device according to an embodiment of the disclosure.

Figure 5C:
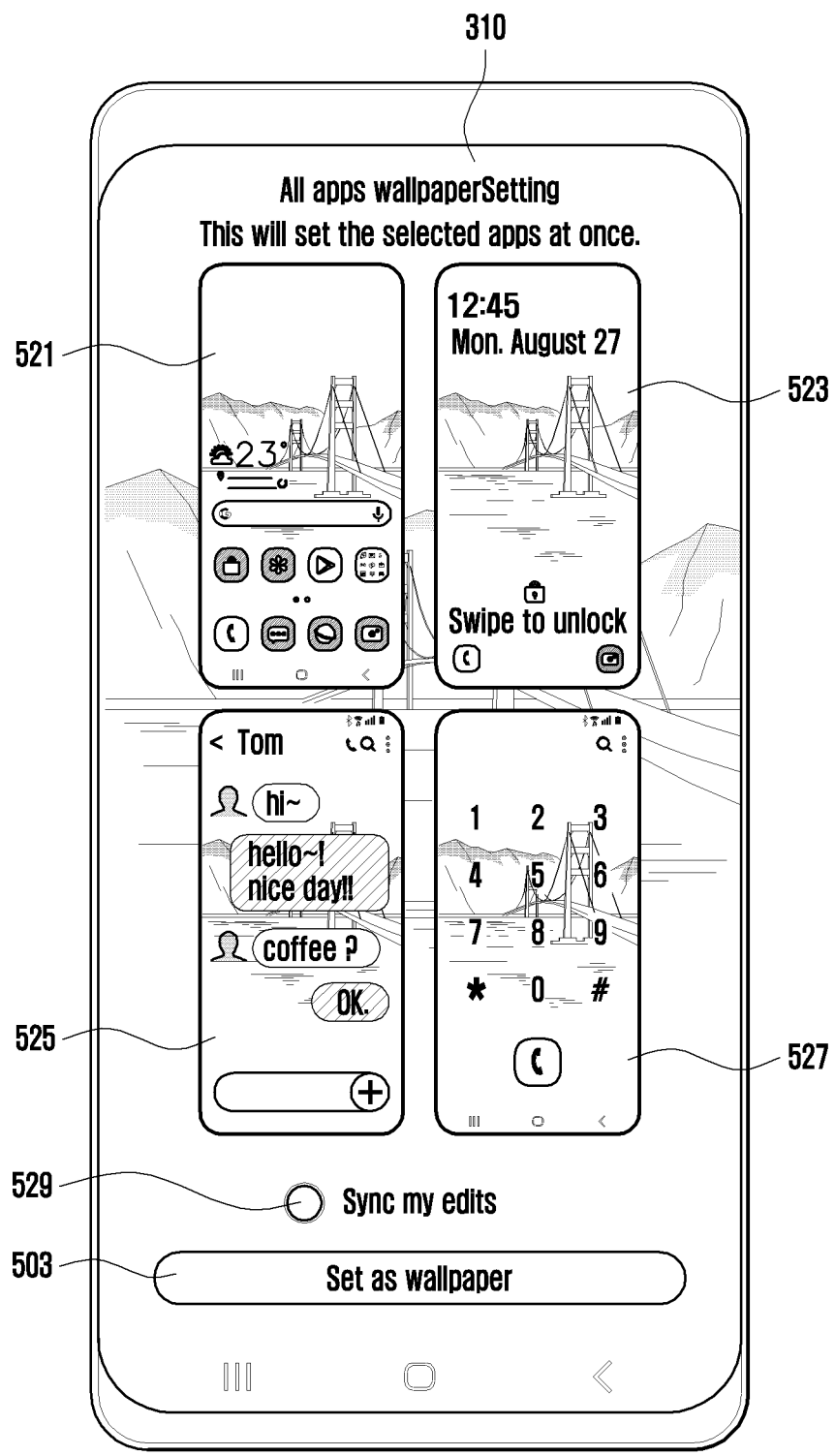
FIG. 5C is a diagram illustrating a screen for selecting applications of which the background images need to be edited and modifying a plurality of screens in an electronic device according to an embodiment of the disclosure.

FIG. 5C is a diagram illustrating a screen for selecting applications of which the background images need to be edited and modifying a plurality of screens in an electronic device according to an embodiment of the disclosure.

Figure 5D:
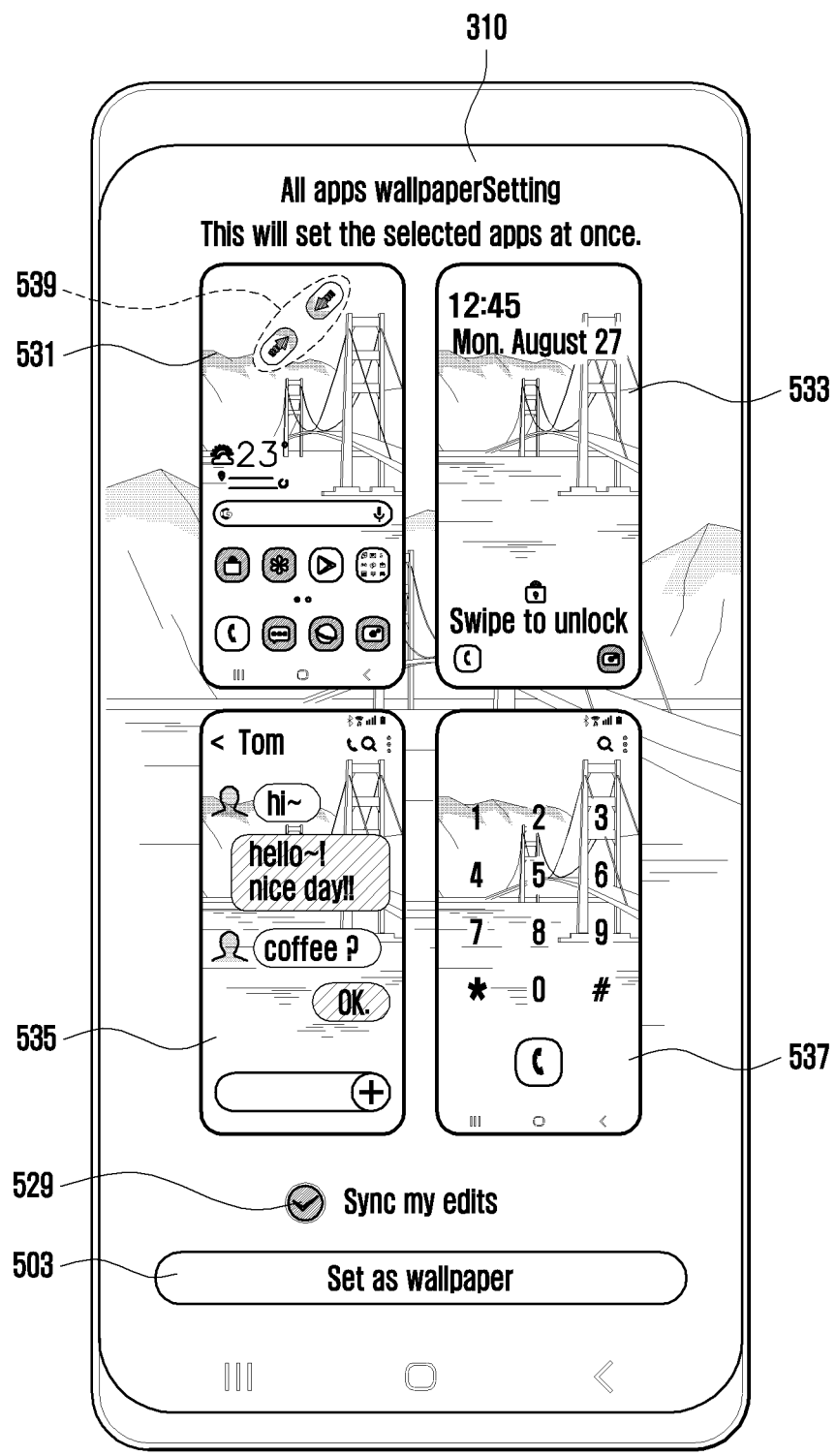
FIG. 5D is a diagram illustrating a screen for selecting applications of which the background images need to be edited and modifying a plurality of screens in an electronic device according to an embodiment of the disclosure.

FIG. 5D is a diagram illustrating a screen for selecting applications of which the background images need to be edited and modifying a plurality of screens in an electronic device according to an embodiment of the disclosure.

Figure 5E:
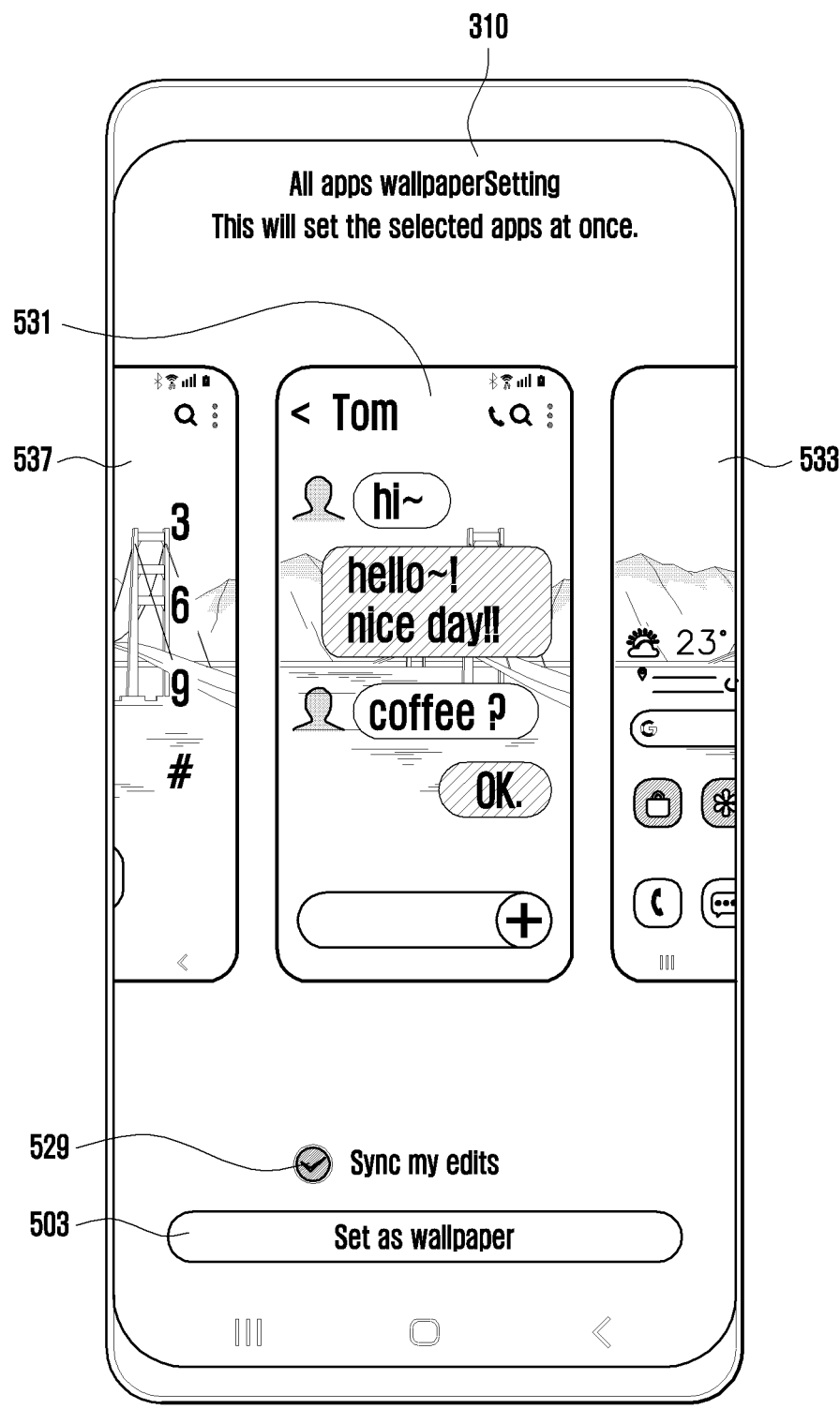
FIG. 5E is a diagram illustrating a screen for selecting applications of which the background images need to be edited and modifying a plurality of screens in an electronic device according to an embodiment of the disclosure.

FIG. 5E is a diagram illustrating a screen for selecting applications of which the background images need to be edited and modifying a plurality of screens in an electronic device according to an embodiment of the disclosure.

Referring to FIG. 5A, the electronic device (e.g., the electronic device 300 of FIG. 3) may provide a function of modifying a plurality of screens using an application for modifying a plurality of screens. The electronic device 300 may display a screen including a first preview image 501 corresponding to a first screen, a button 503 for applying a modification, and a button 505 for selecting at least one application in order to set a background image, on a display (e.g., the display 310 of FIG. 3).

According to various embodiments, the electronic device 300 may display the list of applications of which the background images are settable in response to user input on the button 505 for selecting at least one application in order to set a background image, on the display.

Referring to FIG. 5B, the electronic device 300 may display an application list 511 of applications for which the background images are settable. The electronic device 300 may receive user input for selecting at least one application included in the application list 511. The application to be selected may be an application in which a background image is already set, and may be an application selected in order to modify the background image.

According to various embodiments, the electronic device 300 may display the preview image of at least one screen to be displayed when the selected application runs.

Referring to FIG. 5C, the electronic device 300 may display a screen including the preview images of screens providable by selected applications (e.g., a first preview image 521, a second preview image 523, a third preview image 525, and a fourth preview image 527), a button 529 for selecting whether to activate a function of performing synchronization so as to apply a modification corresponding to user input to a plurality of screens, and a button 503 for applying a modification.

Referring to FIG. 5D, the electronic device 300 may receive a user input 539 for modifying the background image of a first screen on a first preview image 531 corresponding to the first screen.

According to various embodiments, the electronic device 300 may apply a modification corresponding to the user input 539 to the background image of the first screen so as to modify the background image included in the first screen. The modified background image may be stored in the memory 330.

According to various embodiments, the electronic device 300 may display the preview image 531 of the first screen, which includes the modified background image, on the display 310.

According to various embodiments, the electronic device 300 may apply a modification made in the first preview image 531 to a second preview image 533, a third preview image 535, and a fourth preview image 537, in response to identifying that the button 529 for selecting whether to activate the function of performing synchronization so as to apply the modification corresponding to the user input 539 to a plurality of screens is selected.

According to various embodiments, the electronic device 300 may simultaneously modify the background images of the first screen, the second screen, the third screen, and the fourth screen based on the user input 539 performed on the first preview image 531. The electronic device 300 may modify the background images by synchronizing the modification corresponding to the user input 539 among the background images of the plurality of screens, so that the modification is applied.

According to various embodiments, the electronic device 300 may receive the user input 539 and may copy input data corresponding to the user input 539. The electronic device 300 may modify the background images of the first screen, the second screen, the third screen, and the fourth screen using the copied input data. For example, the processor 320 may modify the background images respectively included in the plurality of screens by applying the copied input data to the plurality of screens. According to the above-described scheme, the background images of the second screen, the third screen, and the fourth screen may be modified based on the user input 539 performed on the first preview image 531.

According to various embodiments, the electronic device 300 may display the first preview image 531, the second preview image 533, the third preview image 535, and the fourth preview image 537, including the modified background images, on the display 310.

According to various embodiments of the disclosure in which the function of synchronizing a modification made in a single screen (e.g., the first screen) among the single screen and other screens (e.g., the second screen, the third screen, and the fourth screen) is implemented, a plurality of screens may be modified based on a single user input for modifying the first screen, and the usability for a user with respect to customizing screens may be increased.

FIG. 5D illustrates an embodiment that displays all of a plurality of preview images on the display 310. However, the electronic device 300 according to various embodiments may display only some of the plurality of preview images on the display 310.

Referring to FIG. 5E, the electronic device 300 may display the first preview image 531 among the plurality of preview images. The other preview images (e.g., the second preview image 533, the third preview image 535, and the fourth preview image 537) may not be displayed, and the preview image to be displayed may be selected based on user input performed in a swiping manner. For example, the electronic device 300 may display the fourth preview image 537 in response to reception of swiping input to the right. As another example, the electronic device 300 may display the second preview image 533 in response to reception of swiping input to the left.

Figure 6A:
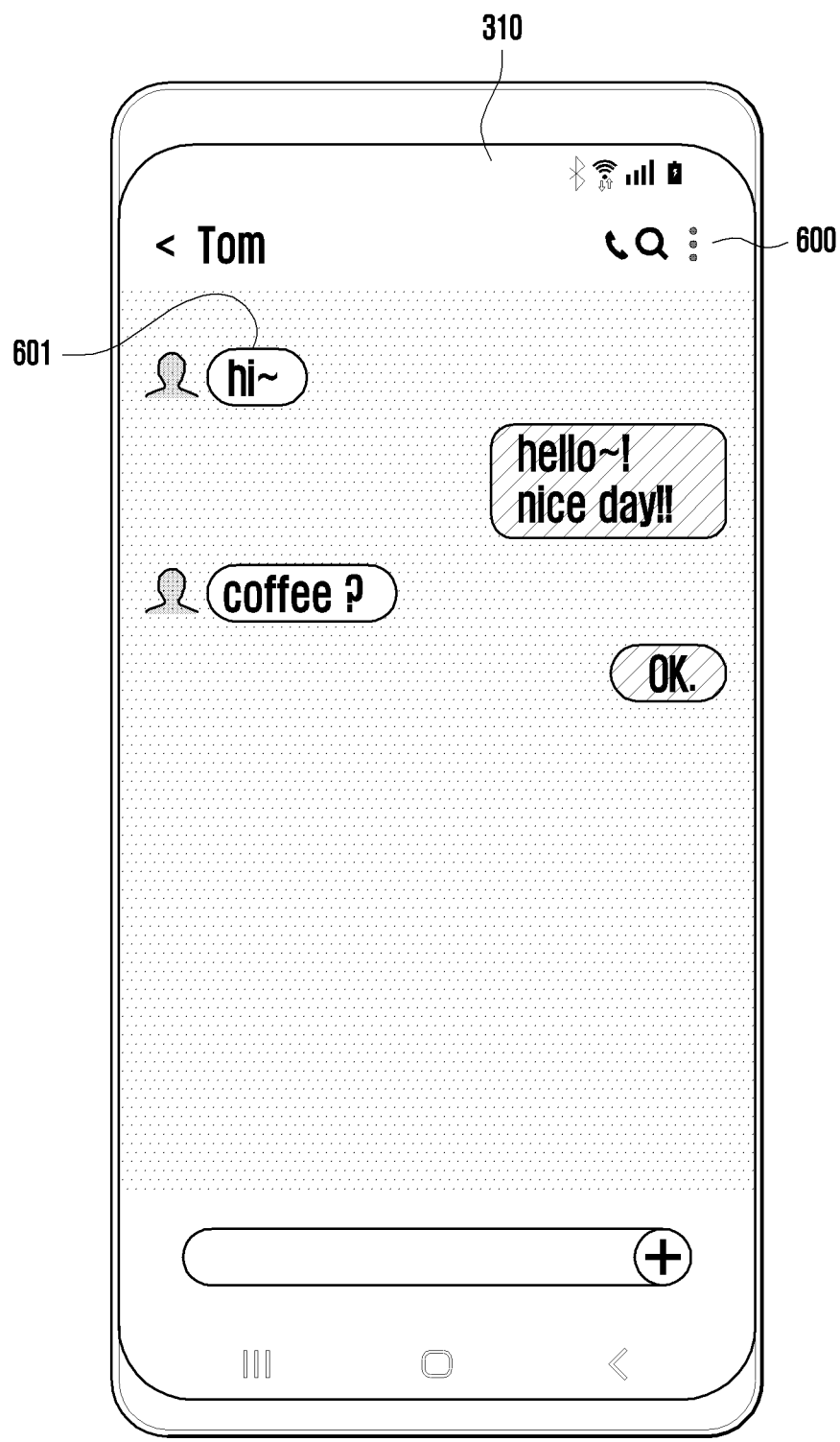
FIG. 6A is a diagram illustrating an embodiment that modifies a plurality of screens according to the type of application that provides a screen in an electronic device according to an embodiment of the disclosure.

FIG. 6A is a diagram illustrating an embodiment that modifies a plurality of screens according to the type of application that provides a screen in an electronic device according to an embodiment of the disclosure.

Figure 6B:
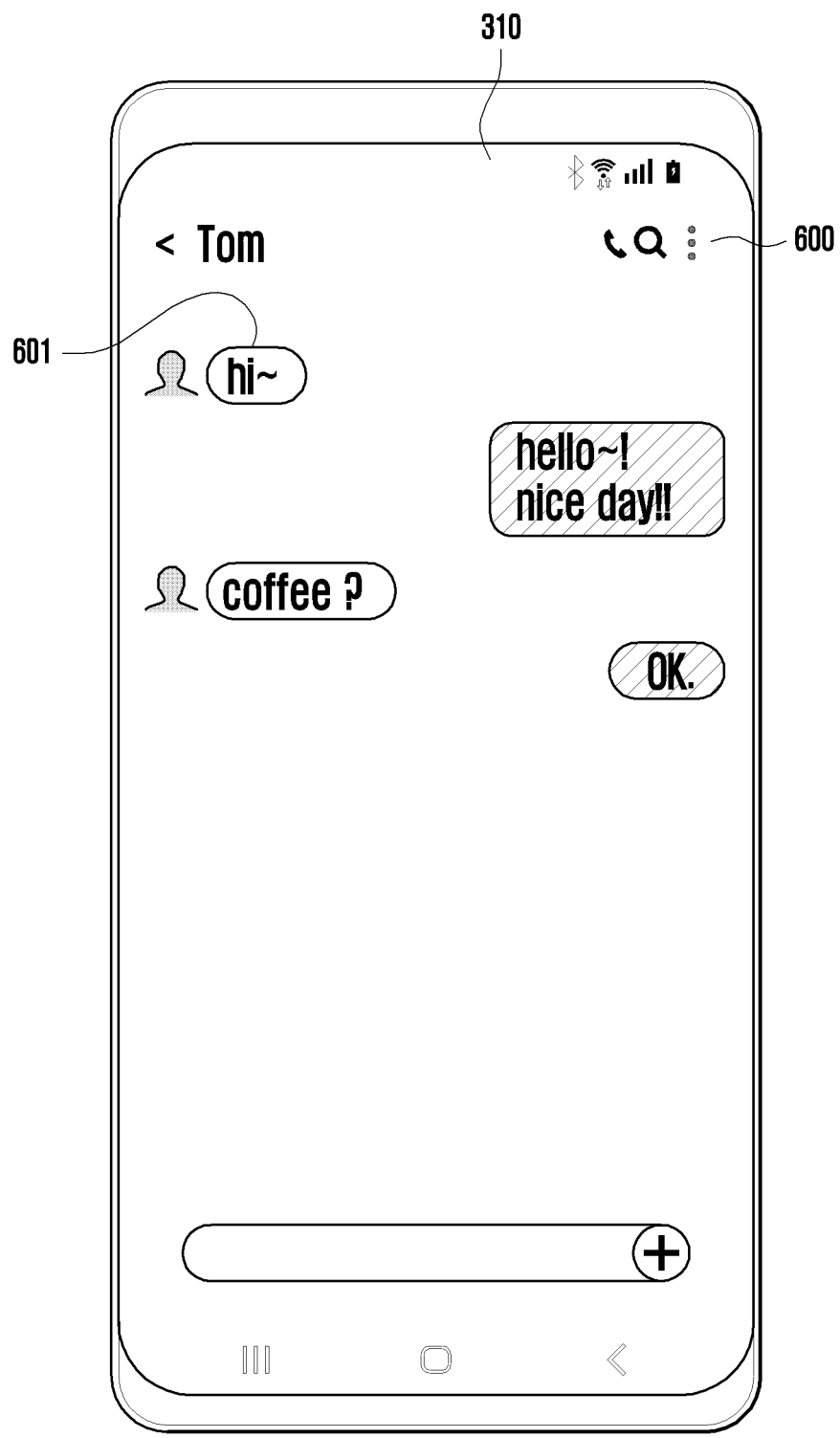
FIG. 6B is a diagram illustrating an embodiment that modifies a plurality of screens according to the type of application that provides a screen in an electronic device according to an embodiment of the disclosure.

FIG. 6B is a diagram illustrating an embodiment that modifies a plurality of screens according to the type of application that provides a screen in an electronic device according to an embodiment of the disclosure.

According to various embodiments, an electronic device (e.g., the electronic device 300 of FIG. 3) may modify the background images of a plurality of screens by applying a modification made in a first screen, which corresponds to a user input performed on the first preview image (e.g., the first preview image 421 of FIG. 4C) of the first screen, to the background images of the other screens simultaneously. The above-described scheme does not consider the characteristics of the visual element included in each of the plurality of screens, and thus the visibility of the visual elements may decrease. For example, in a modified background image that has a higher chroma or a lower brightness, the visibility of a visual element that includes content (e.g., text) having a high probability of being checked in detail by a user may deteriorate.

Referring to FIG. 6A, a visual element 601 included in a screen 600 displayed on a display (e.g., the display 310 of FIG. 3) of the electronic device 300 may include text that has a high probability of being checked in detail by a user. If the background image of the screen 600 is modified into a background image having a relatively low brightness or a relatively high chroma, according to the above-described embodiments, the visibility of the visual element 601 may deteriorate.

According to various embodiments, the electronic device 300 may additionally modify a background image by modifying at least a part of the background image which corresponds to an area in which a visual element is disposed based on the type or characteristics of the visual element. For example, the electronic device 300 may identify that a visual element includes content (e.g., text) that a user needs to check based on the characteristics of the visual element, and the electronic device 300 may modify at least a part of the background image, corresponding to the area in which the visual element is disposed, so as to have a lower chroma or a higher brightness than other areas.

According to various embodiments, the electronic device 300 may additionally modify a background image based on the type of an application corresponding to a screen to be modified. The electronic device 300 may identify whether the application is an application that includes a lot of main content that a user needs to check (e.g., a text message application or an SNS application), based on the type of application. The electronic device 300 may modify a background image to have a low chroma or a low brightness if the processor 320 identifies that an application corresponding to a screen to be modified provides content (e.g., text) that a user needs to check. The processor 320 may modify the background image corresponding to the screen to be modified, so as to have a lower chroma or a higher brightness than background images corresponding to the other screens in response to identifying that an application corresponding to the screen to be modified is an application including a relatively small amount of content (e.g., text) that a user needs to check.

Referring to FIG. 6B, the electronic device 300 may identify that an application corresponding to a screen 600 is a text message application that provides content (e.g., text) that a user needs to check. The electronic device 300 may modify a background image so as to have a low chroma or a high brightness.

According to various embodiments, the electronic device 300 may synchronize a modification corresponding to a user input performed on the first preview image 421 among a plurality of screens so that the background images of the plurality of screens may be modified without user input for modifying the other screens. The electronic device 300 may modify a background image based on the characteristics of a visual element included in each of the plurality of screens or on the characteristics of the application corresponding to each of the plurality of screens. For example, the electronic device 300 may enlarge or reduce the background image of each of the plurality of screens based on user input, and may apply the chroma or brightness of the modified background image differently depending on the characteristics of a visual element included in each of the plurality of screens or the characteristics of an application included in each of the plurality of screens.

Figure 7A:
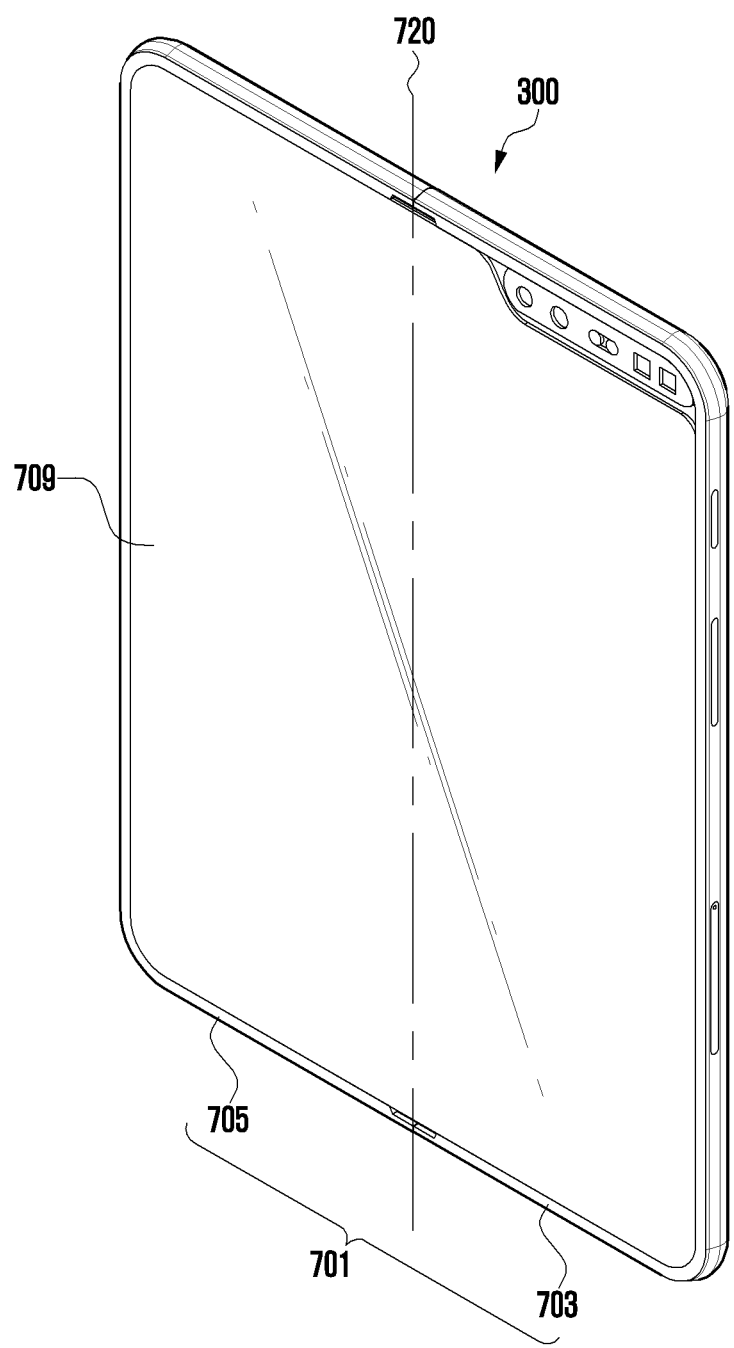
FIG. 7A is a diagram illustrating an embodiment for modifying a plurality of screens based on the characteristics of a display in an electronic device equipped with a plurality of displays according to an embodiment of the disclosure.

FIG. 7A is a diagram illustrating an embodiment for modifying a plurality of screens based on the characteristics of a display in an electronic device equipped with a plurality of displays according to an embodiment of the disclosure.

Figure 7B:
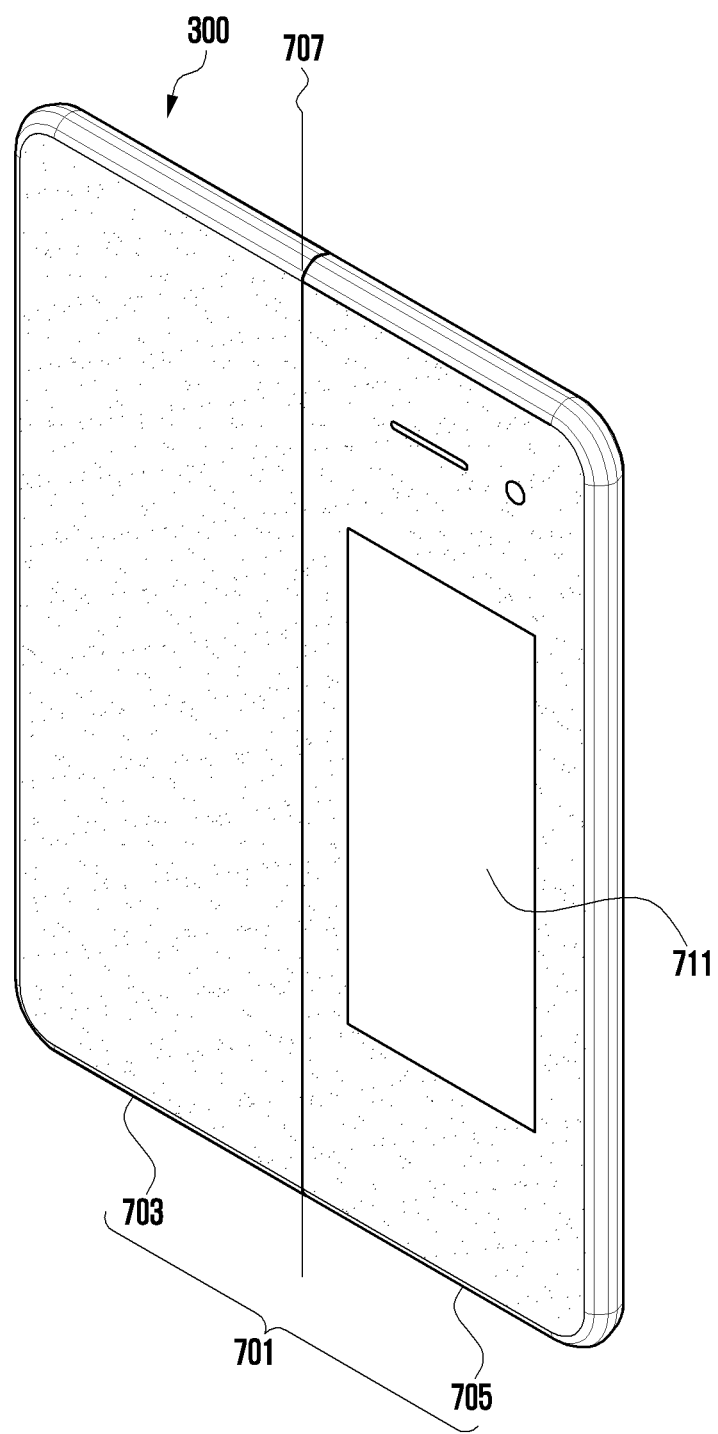
FIG. 7B is a diagram illustrating an embodiment for modifying a plurality of screens based on the characteristics of a display in an electronic device equipped with a plurality of displays according to an embodiment of the disclosure.

FIG. 7B is a diagram illustrating an embodiment for modifying a plurality of screens based on the characteristics of a display in an electronic device equipped with a plurality of displays according to an embodiment of the disclosure.

Figure 7C:
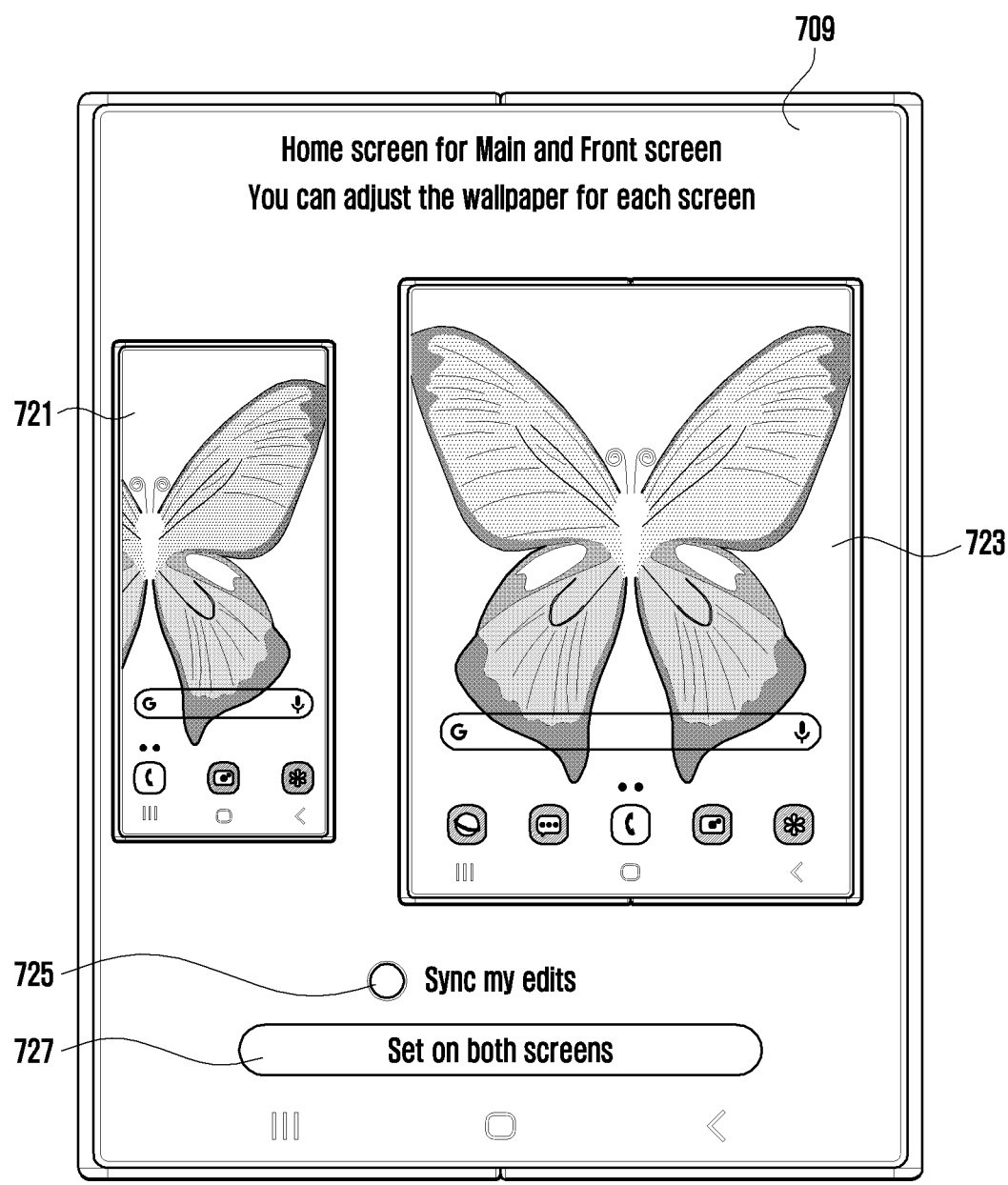
FIG. 7C is a diagram illustrating an embodiment for modifying a plurality of screens based on the characteristics of a display in an electronic device equipped with a plurality of displays according to an embodiment of the disclosure.

FIG. 7C is a diagram illustrating an embodiment for modifying a plurality of screens based on the characteristics of a display in an electronic device equipped with a plurality of displays according to an embodiment of the disclosure.

Figure 7D:
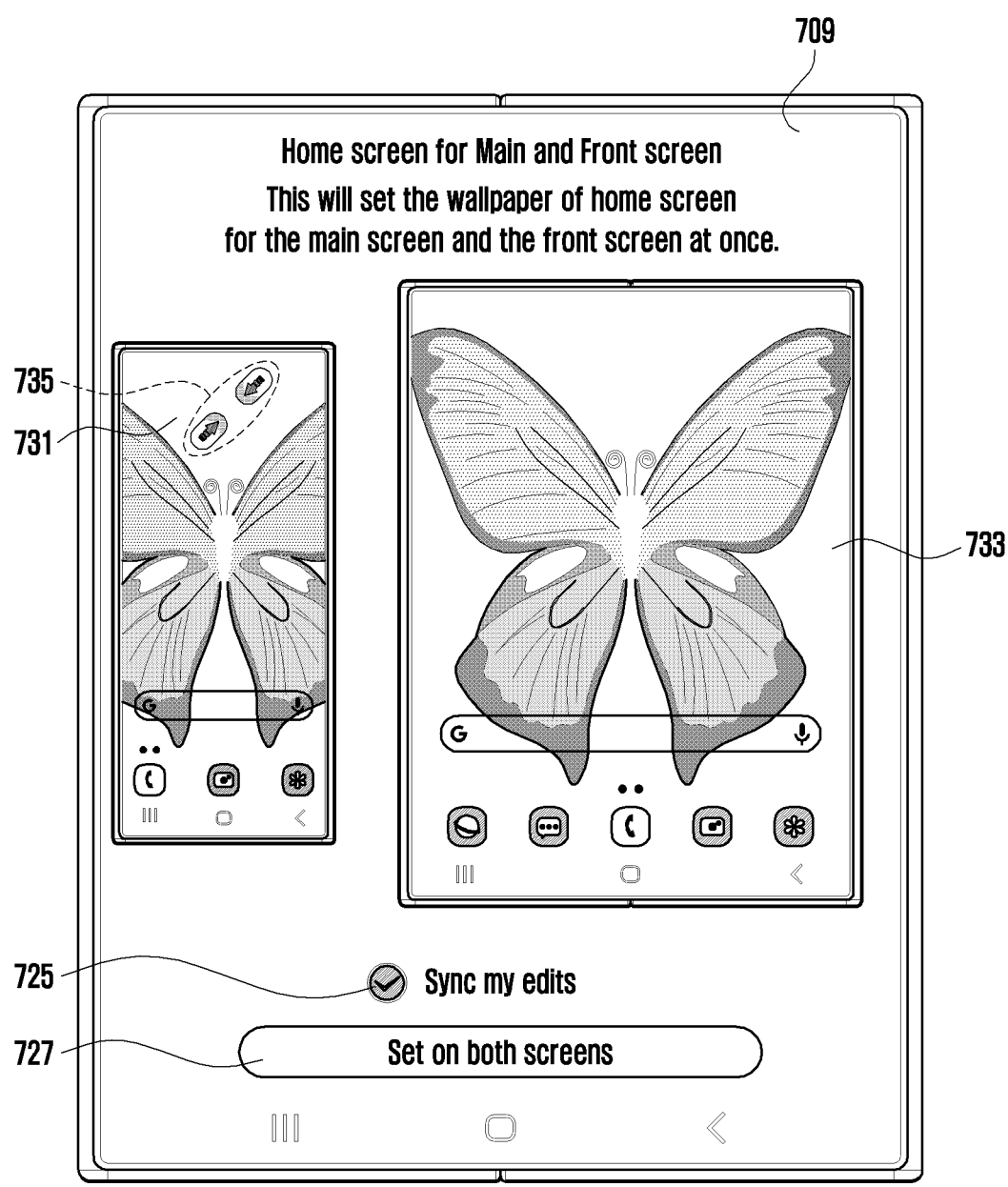
FIG. 7D is a diagram illustrating an embodiment for modifying a plurality of screens based on the characteristics of a display in an electronic device equipped with a plurality of displays according to an embodiment of the disclosure.

FIG. 7D is a diagram illustrating an embodiment for modifying a plurality of screens based on the characteristics of a display in an electronic device equipped with a plurality of displays according to an embodiment of the disclosure.

Figure 7E:
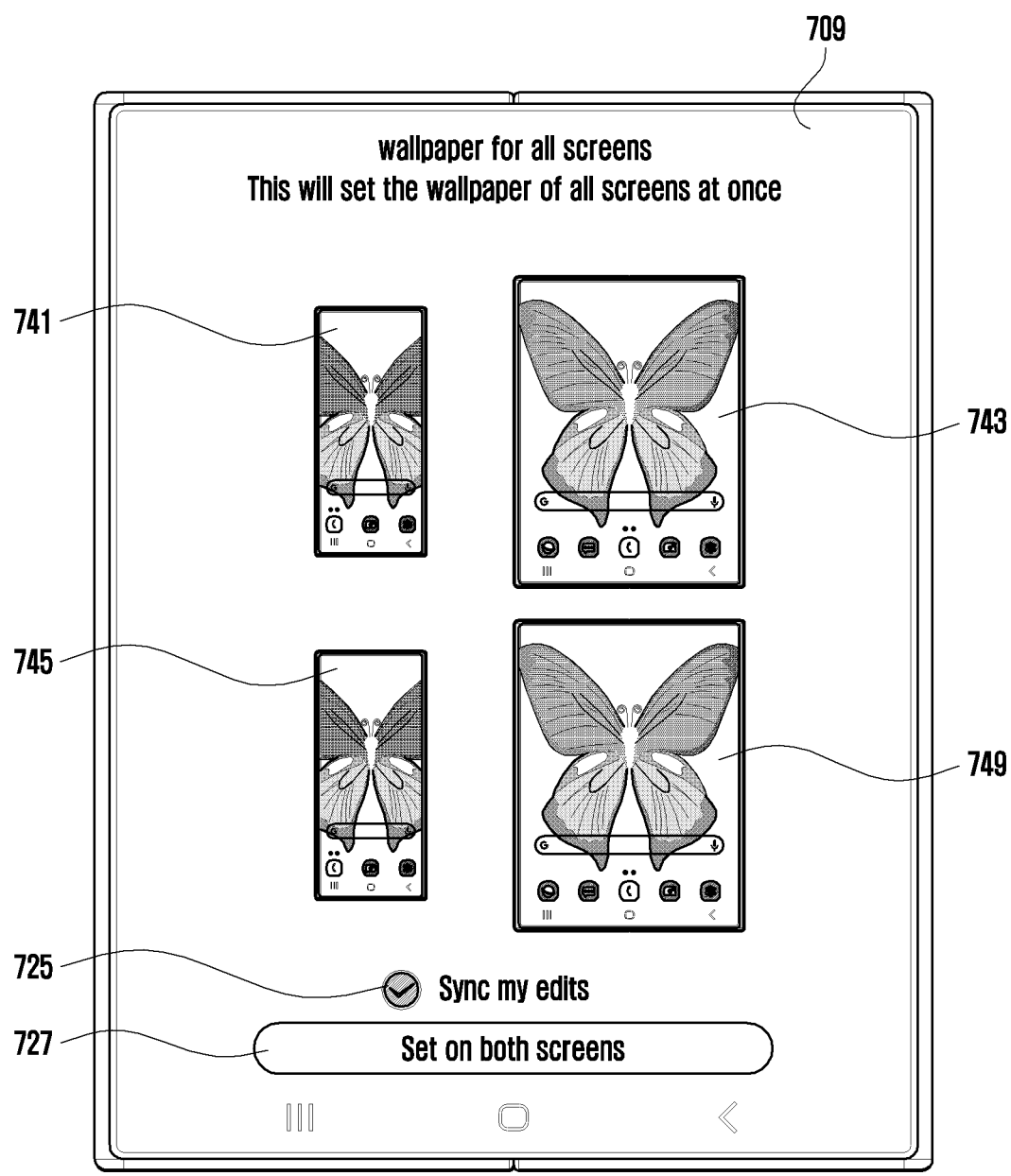
FIG. 7E is a diagram illustrating an embodiment for modifying a plurality of screens based on the characteristics of a display in an electronic device equipped with a plurality of displays according to an embodiment of the disclosure.

FIG. 7E is a diagram illustrating an embodiment for modifying a plurality of screens based on the characteristics of a display in an electronic device equipped with a plurality of displays according to an embodiment of the disclosure.

According to the above embodiments, it has been described that an electronic device (e.g., the electronic device 300 of FIG. 3) modifies the background images of screens displayed on a single display 310. However, the disclosure may be applied to an embodiment that modifies the background image of a screen to be displayed on another display in an electronic device (e.g., a foldable electronic device) equipped with a plurality of displays, and to an embodiment that modifies the background image of a screen displayed in an external electronic device equipped with a display. Hereinafter, an example in which an electronic device equipped with a plurality of displays applies the embodiments of the disclosure will be described.

Referring to FIG. 7A, an electronic device (e.g., the electronic device 300 of FIG. 3) may include a foldable housing 701. The foldable housing 701 may include a first housing structure 703 and a second housing structure 705 which are connected via a hinge structure.

According to various embodiments, the second housing structure 705 may be connected with the first housing structure 703 in a foldable manner. The first housing structure 703 and the second housing structure 705 may be foldable based on a folding axis 720 that extends in a first direction (as shown in FIG. 7A). The first housing structure 703 and the second housing structure 705 may be disposed to face each other when the two structures are in a folded state.

Referring to FIG. 7A, the angle between the first housing structure 703 and the second housing structure 705 may be 180 degrees. If the angle between the first housing structure 703 and the second housing structure 705 is greater than or equal to a predetermined angle, this defines that the electronic device 300 is in an unfolded state. The predetermined angle may be 180 degrees, but this may be changeable as desired by a designer. If the electronic device 300 is in an unfolded state, the first housing structure 703 and the second housing structure 705 may have a planar structure.

According to various embodiments, a first display 709 (e.g., the display 310 of FIG. 3) may be implemented as a flexible display that covers at least a part of the front side of the first housing structure 703 and the second housing structure 705. The first display 709 may include a touch sensor for receiving user touch input or a pressure sensor for receiving pressure (or force touch) input. When the electronic device 300 is in a folded state, a part of the first display 709 implemented in the first housing structure 703 and the other part of the first display 709 implemented in the second housing structure 705 may face each other. When the electronic device 300 is in an unfolded state, a part of the first display 709 implemented in the first housing structure 703 and the other part of the first display 709 implemented in the second housing structure 705 may be in a single plane.

Referring to FIG. 7B, the electronic device 300 according to various embodiments may further include a second display 711. The second display 711 may be implemented in a different side from the first display 709. For example, the first display 709 may be implemented in the front side of the electronic device 300, and the second display 711 may be implemented in a second rear cover disposed in the rear side.

According to various embodiments, the electronic device 300 may provide a function of modifying a plurality of screens using an application for modifying a plurality of screens. The plurality of screens may include a first screen, displayed on the second display 711, and a second screen, displayed on the first display 709.

Referring to FIG. 7C, the electronic device 300 may provide a function of modifying a plurality of screens using an application for modifying a plurality of screens. The electronic device 300 may display, on the first display 709, a screen including a first preview image 721 corresponding to a first screen and a second preview image 723 corresponding to a second screen in order to modify a plurality of screens, a button 725 for selecting whether to activate a function of performing synchronization so as to apply a modification corresponding to user input to a plurality of screens, and a button 727 for applying a modification.

According to various embodiments, the electronic device 300 may apply a modification made in the first preview image 721 to the second preview image 723 in response to identifying that the button 725 for selecting whether to activate the function of performing synchronization so as to apply a modification corresponding to a user input to a plurality of screens is selected. The electronic device 300 may not apply the modification made in the first preview image 721 to the second preview image 723 in response to identifying that the button 725 for selecting whether to activate the function of performing synchronization so as to apply a modification corresponding to a user input to a plurality of screens is not selected.

Referring to FIG. 7D, the electronic device 300 may receive user input 735 for modifying the background image of a first screen on a first preview image 731 corresponding to the first screen.

According to various embodiments, the electronic device 300 may apply a modification corresponding to the user input 735 to the background image of the first screen so as to modify the background image included in the first screen. The modified background image may be stored in the memory 330.

According to various embodiments, the electronic device 300 may apply a modification made in the first preview image 731 to a second preview image 733 upon identifying that the button 725 for selecting whether to activate the function of performing synchronization so as to apply a modification corresponding to user input to the plurality of screens is selected.

According to various embodiments, the electronic device 300 may modify the background images of the first screen and the second screen based on the user input performed on the first preview image 731. The electronic device 300 may modify the background images by synchronizing the modification corresponding to the user input among the background images of the plurality of screens so that the modification is applied.

According to various embodiments, the electronic device 300 may receive the user input 735 and may copy input data corresponding to the user input 735. The electronic device 300 may modify the background images of the first screen and the second screen using the copied input data. For example, the processor 320 may modify the background images respectively included in the plurality of screens by applying the copied input data to the plurality of screens. According to the above-described scheme, the background image of the second screen may be modified based on the user input 735 performed on the first preview image 731.

According to various embodiments, the electronic device 300 may display the first preview image 731 and a second preview image 733, which include the modified background images, on the first display 709.

Although the above-described embodiment illustrates an embodiment that modifies the background image of a home screen to be displayed on the first display 709 and the second display 711, the disclosure may modify the background images of a home screen and a lock screen simultaneously.

Referring to FIG. 7E, the electronic device 300 may display a screen including a preview image 741 corresponding to a lock screen to be displayed on the second display 711, a preview image 743 corresponding to a lock screen to be displayed on the first display 709, a preview image 745 corresponding to a home screen to be displayed on the second display 711, and a preview image 749 corresponding to a home screen to be displayed on the first display 709, on the first display 709.

According to various embodiments, the electronic device 300 may apply a modification corresponding to a user input to the background images of the plurality of preview images 741, 743, 745, and 749 in response to reception of user input for modifying a background image on one of the plurality of preview images 741, 743, 745, and 749.

According to various embodiments of the disclosure in which the function of synchronizing a modification made in a single screen (e.g., the first screen) between the single screen and another screen (e.g., the second screen) is implemented, a plurality of screens may be modified based on a single user input for modifying the first screen, whereby usability for a user with respect to customizing screens may be increased.

According to various embodiments, the characteristics of the first display 709 and the second display 711 of the electronic device (e.g., the electronic device 300 of FIG. 3) may be different from each other. For example, the first display 709 may have an aspect ratio in which the width value is higher than the height value. The second display 711 may have an aspect ratio in which the height value is higher than the width value. According to another example, the resolution of the first display 709 may be higher than the resolution of the second display 711.

According to various embodiments, the electronic device 300 may modify the background images of the plurality of screens by applying a modification made in a single screen among the plurality of screens to the background images of the other screens simultaneously. The above-mentioned scheme may not take into consideration the characteristics of the display on which each of the plurality of screens is to be displayed, and thus the background may be modified differently from the intention of a user.

According to various embodiments, when modifying the background images of another screen, which is different from a screen that corresponds to a user input, the electronic device 300 may modify the background image based on the characteristics of a display (e.g., the second display 711) on which the other screen is to be displayed. For example, the electronic device 300 may modify the size of the background image of the screen to be displayed on the first display 709, and may set the background image in the modified size as the background image of the other screen. As another example, the electronic device 300 may crop at least a part of the background image of the screen to be displayed on the first display 709, and may set the modified image as the background image of the other screen. The background image set as described above may be an image that has the same aspect ratio as that of the second display 711.

According to various embodiments, if the size of the modified image is smaller than a display (e.g., the first display 709), the electronic device 300 may add an image to the modified background image, so as to generate an image having the same size as that of the display. The added image may be an image having a color similar or identical to that of the modified image.

For ease of description, the embodiments of FIGS. 7A to 7E provide a description under the assumption that the electronic device 300 is implemented in an in-folding manner (i.e., inwardly-folding manner) so that the first display 709 is folded forwards. However, the disclosure may be applicable to the case in which the electronic device 300 is implemented in an out-folding manner (i.e., outwardly-folding manner) so that the first display 709 is folded backwards. In the case in which the electronic device 300 is implemented in an out-folding manner so that the first display 709 is folded backwards, the second display 711 may display a partial area displayed when the first display 709 is folded. The electronic device 300 may simultaneously modify the background image of a screen displayed when the first display 709 is unfolded and the background image of a screen displayed in a partial area when the first display 709 is folded.

Figure 8:
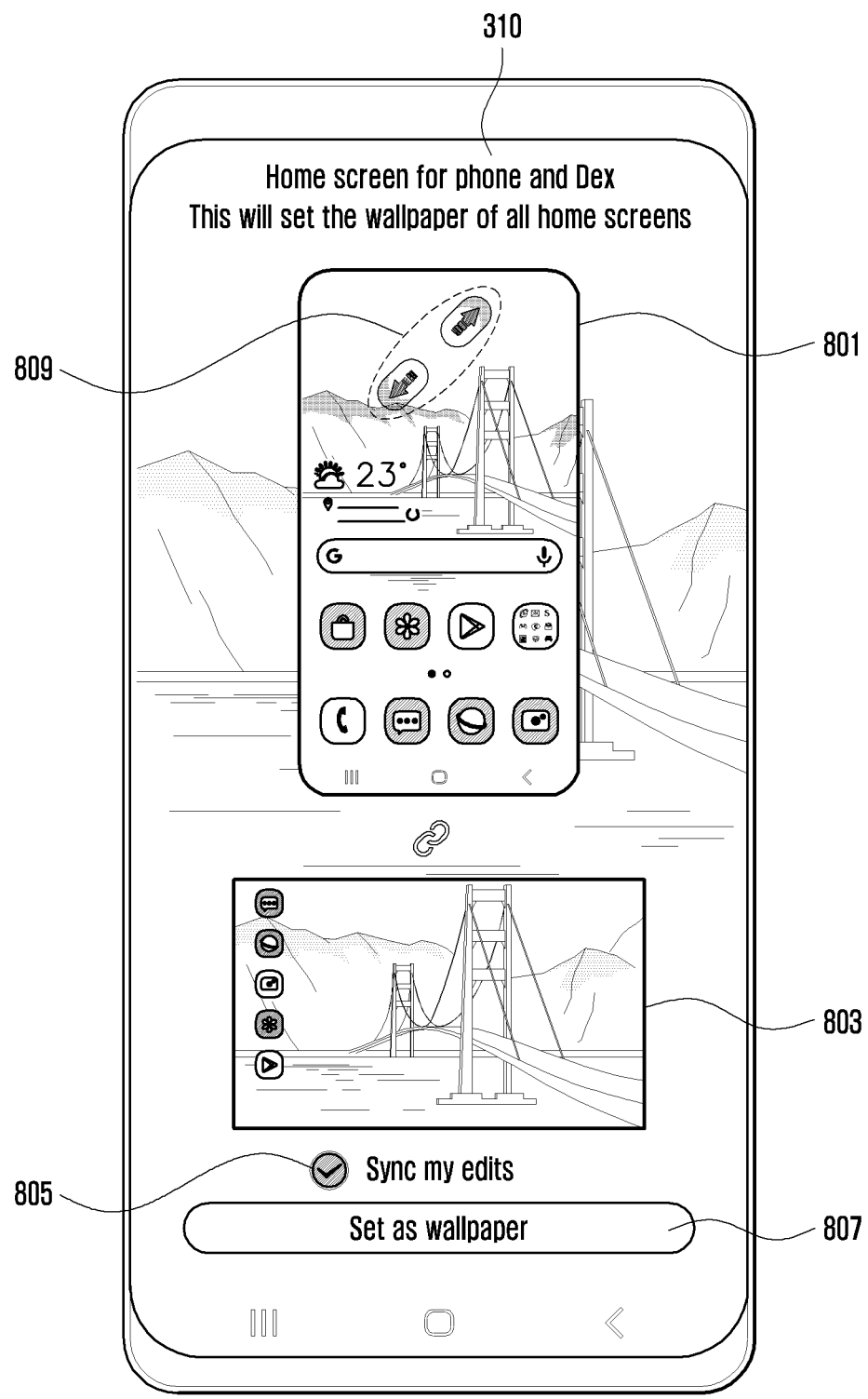
FIG. 8 is a diagram illustrating an embodiment for modifying a plurality of screens, based on the characteristics of a display of an external electronic device connected to an electronic device, in the electronic device according to an embodiment of the disclosure.

FIG. 8 is a diagram illustrating an embodiment for modifying a plurality of screens, based on the characteristics of a display of an external electronic device connected to an electronic device, in the electronic device according to an embodiment of the disclosure.

The electronic device (e.g., the electronic device 300 of FIG. 3) according to various embodiments may provide a function of modifying a plurality of screens using an application for modifying a plurality of screens. At least one of the plurality of screens is a screen displayed on an external electronic device (e.g., the electronic device 102 of FIG. 1 or the electronic device 104 of FIG. 1) connected to the electronic device 300, and may be a screen rendered by the electronic device 300.

Referring to FIG. 8, according to various embodiments, the electronic device 300 may display, on a display (e.g., the display 310 of FIG. 3), a screen including a first preview image 801 corresponding to a first screen to be displayed in the electronic device 300 and a second preview image 803 corresponding to a second screen to be displayed in the external electronic device 102 or 104 in order to modify a plurality of screens, a button 805 for selecting whether to activate a function of performing synchronization so as to apply a modification corresponding to user input to a plurality of screens, and a button 807 for applying a modification.

The electronic device 300 may receive user input 809, for modifying the background image of the first screen, on the first preview image 801 corresponding to the first screen.

According to various embodiments, the electronic device 300 may apply a modification corresponding to the user input 809 to the background image of the first screen so as to modify the background image included in the first screen. The modified background image may be stored in the memory 330.

According to various embodiments, the electronic device 300 may apply a modification made in the first preview image 801 to the second preview image 803, in response to identifying that the button 805 for selecting whether to activate the function of performing synchronization so as to apply a modification corresponding to user input to a plurality of screens is selected.

According to various embodiments, the electronic device 300 may modify the background images of the first screen and the second screen based on the user input performed on the first preview image 801. The electronic device 300 may modify the background images by synchronizing the modification corresponding to the user input among the background images of the plurality of screens so that the modification is applied.

According to various embodiments, the electronic device 300 may display the first preview image 801 and a second preview image 803, which include the modified background images, on the display 310.

According to various embodiments of the disclosure of the function of synchronizing a modification made in a single screen (e.g., the first screen) between the single screen and another screen (e.g., the second screen), a plurality of screens may be modified based on a single user input for modifying the first screen, whereby usability for a user with respect to customizing screens may be increased.

An electronic device according to various embodiments may include a first display, a memory, and a processor, and the processor may be configured to: control the first display so as to display the preview image of each of a plurality of screens including a first screen; receive a first user input for modifying the background image of the first screen in an area in which the preview image corresponding to the first screen is displayed; modify the background image of each of the plurality of screens by performing synchronization so as to apply a modification corresponding to the first user input to the background images of the plurality of screens; and control the first display so as to display the preview image of each of the plurality of screens including the modified background images.

In the electronic device according to various embodiments, the processor is configured to copy first input data corresponding to the first user input and to modify the background image of each of the plurality of screens based on the copied input data.

In the electronic device according to various embodiments, the processor is configured to modify the plurality of screens so as to include background images to which the modification is applied in response to reception of the first user input.

In the electronic device according to various embodiments, the processor is configured to: receive a second user input for selecting at least one application in order to set a background image; and modify the background image of each of at least one screen included in the selected application based on the first user input.

In the electronic device according to various embodiments, the processor is configured to: identify the characteristics or a type of a visual element included in a second screen among the plurality of screens; and modify at least a part of the background image of the second screen, which corresponds to an area in which the visual element is disposed, based on the characteristics or type of the visual element.

In the electronic device according to various embodiments, the plurality of screens may include a third screen to be displayed on a second display, and the processor may be configured to modify the background image of the third screen based on the first user input and the characteristics of the second display.

In the electronic device according to various embodiments, the processor is configured to modify the background image of the third screen by changing the resolution of the background image of the first screen.

In the electronic device according to various embodiments, the second display is disposed in the electronic device, or is disposed in an external electronic device connected to the electronic device.

In the electronic device according to various embodiments, the processor is configured to: generate modification data corresponding to the first user input; and generate background images of the plurality of screens based on the background image of the first screen and the modification data.

In the electronic device according to various embodiments, the modification data may include information indicating an area of the background image to be displayed on the first display.

In the electronic device according to various embodiments, the first user input is at least one user input among user input for selecting an area to be displayed from the background image and user input for enlarging or reducing the background image.

Figure 9:
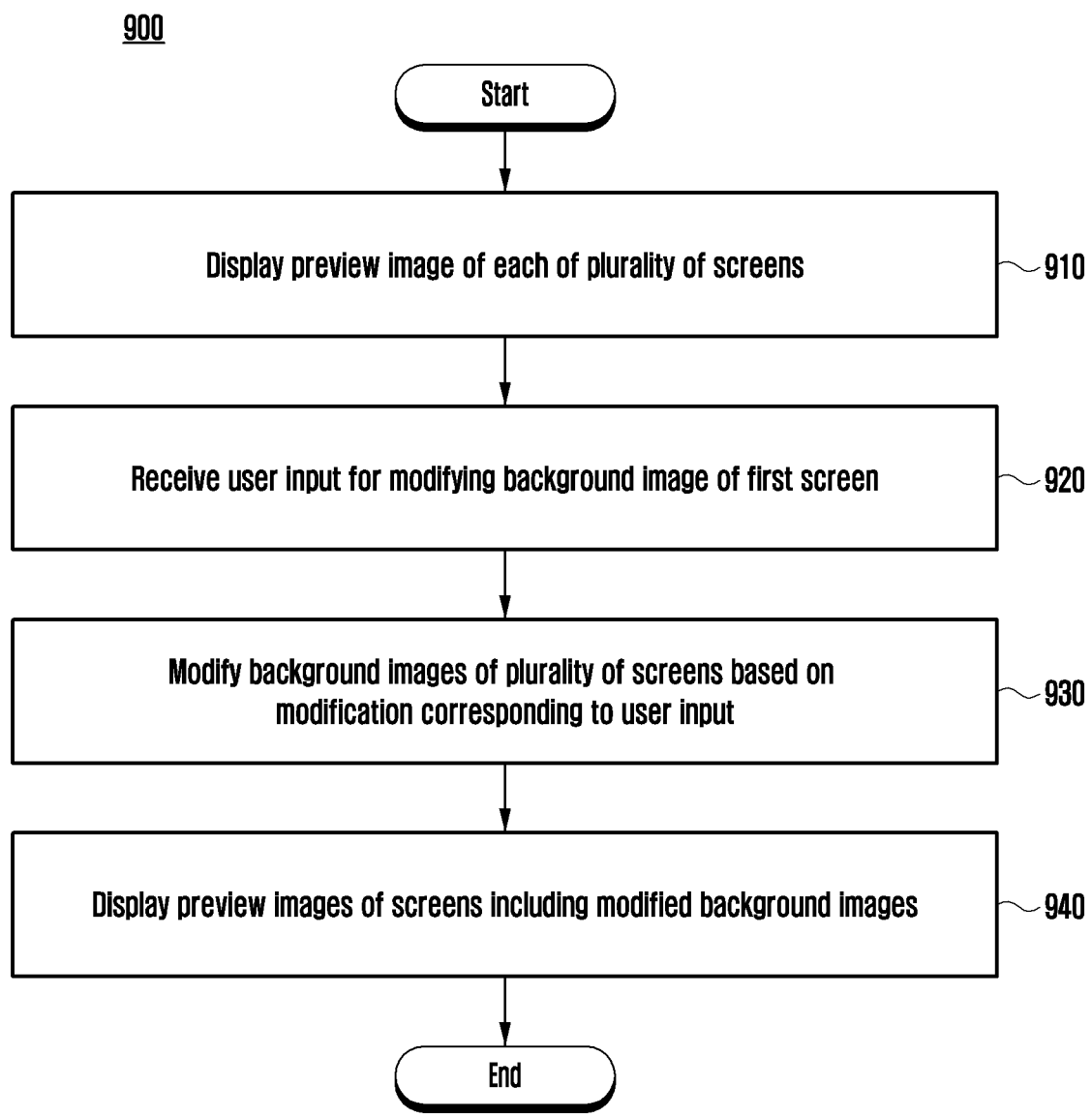
FIG. 9 is a flowchart illustrating an operation method of an electronic device according to an embodiment of the disclosure.

FIG. 9 is a flowchart illustrating an operation method 900 of an electronic device according to an embodiment of the disclosure.

Referring to FIG. 9, according to various embodiments, in operation 910, an electronic device (e.g., the electronic device 300 of FIG. 3) may display the preview image of each of a plurality of screens (e.g., the first preview image 401 and the second preview image 403 of FIG. 4A).

According to various embodiments, in operation 920, the electronic device 300 may receive user input (e.g., the user input 425 of FIG. 4C) for modifying the background image of the first screen.

According to various embodiments, the electronic device 300 may apply a modification corresponding to the user input 425 to the background image of the first screen so as to modify the background image included in the first screen. The modified background image may be stored in a memory (e.g., the memory 330 of FIG. 3).

According to various embodiments, in operation 930, the electronic device 300 may modify the background images of a plurality of screens based on the modification corresponding to the user input.

According to various embodiments, the electronic device 300 may apply a modification made in the first preview image 401 to the second preview image 403 in response to identifying that a button (e.g., the button 405 of FIG. 4A) for selecting whether to activate the function of performing synchronization so as to apply a modification corresponding to user input to a plurality of screens is selected.

According to various embodiments, the electronic device 300 may modify the background images of the first screen and the second screen based on the user input performed on the first preview image 401. The electronic device 300 may modify the background images by synchronizing the modification corresponding to the user input among the background images of the plurality of screens, so that the modification is applied.

According to various embodiments, the electronic device 300 may receive the user input 425 and may copy input data corresponding to the user input 425. The electronic device 300 may modify the background images of the first screen and the second screen using the copied input data. For example, the electronic device 300 may modify the background images respectively included in the plurality of screens by applying the copied input data to the plurality of screens. According to the above-described scheme, the background image of the second screen may be modified based on the user input performed on the first preview image 421.

According to various embodiments, in operation 940, the electronic device 300 may display the preview images of the screens including the modified background images (e.g., the first preview image 421 of FIG. 4C and the second preview image 423 of FIG. 4C).

According to various embodiments of the disclosure of the function of synchronizing a modification made in a single screen (e.g., the first screen) between the single screen and another screen (e.g., the second screen), a plurality of screens may be modified based on a single user input for modifying the first screen, and the usability for a user with respect to customizing screens may be increased.

Figure 10:
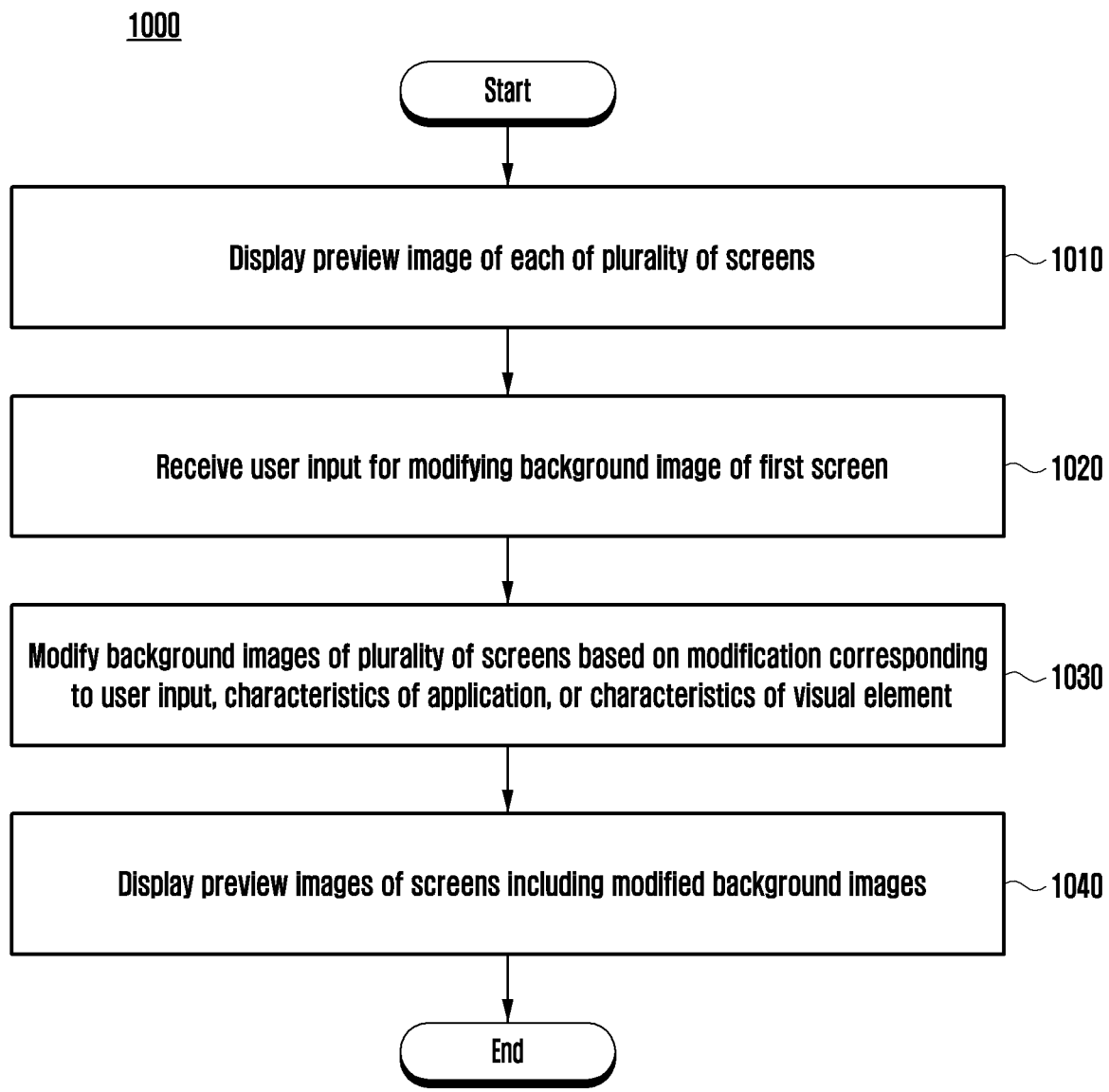
FIG. 10 is a flowchart illustrating an operation method of an electronic device according to an embodiment of the disclosure.

FIG. 10 is a flowchart 1000 illustrating an operation method of an electronic device according to an embodiment of the disclosure.

FIG. 10 relates to an embodiment that differently applies a modification of the background image of each of a plurality of screens depending on the characteristics of the application that provides a screen or the characteristics of a visual element included in the corresponding screen.

Referring to FIG. 10, according to various embodiments, in operation 1010, an electronic device (e.g., the electronic device 300 of FIG. 3) may display the preview image of each of a plurality of screens (e.g., the first preview image 401 and the second preview image 403 of FIG. 4A).

According to various embodiments, in operation 1020, the electronic device 300 may receive user input (e.g., the user input 425 of FIG. 4C) for modifying the background image of a first screen.

According to various embodiments, the electronic device 300 may apply a modification corresponding to the user input 425 to the background image of the first screen so as to modify the background image included in the first screen. The modified background image may be stored in a memory (e.g., the memory 330 of FIG. 3).

According to various embodiments, in operation 1030, the electronic device 300 may modify the background images of a plurality of screens based on a modification corresponding to the user input, the characteristics of an application, or the characteristics of a visual element.

According to various embodiments, the characteristics of the application may be the characteristics of an application that provides the first screen or the characteristics of an application that provides a second screen. The characteristics of the application may include characteristics associated with whether main content (e.g., text included in a text message) that a user needs to check is included.

According to various embodiments, a visual element is a graphical user interface (GUI) included in the first screen or the second screen, and the characteristics of the visual element may include a characteristic associated with whether the visual element includes main content (e.g., text included in a text message) that a user needs to check.

According to various embodiments, when modifying the background images of the plurality of screens, based on the user input, the electronic device 300 may additionally use the characteristics of a visual element included in each screen or the characteristics of an application that provides a screen. For example, the electronic device 300 may enlarge or reduce the background image of each of the plurality of screens based on the user input, and may apply the chroma or brightness of the modified background image differently depending on the characteristics of a visual element included in each of the plurality of screens or the characteristics of an application included in each of the plurality of screens. The electronic device 300 may modify a background image based on the characteristics of a visual element or the characteristics of an application so that the plurality of screens have different background images, based on user input.

According to various embodiments, in operation 1040, the electronic device 300 may display the preview images of the screens including the modified background images (e.g., the first preview image 421 of FIG. 4C and the second preview image 423 of FIG. 4C).

An operation method of an electronic device according to various embodiments may include: displaying, on a first display, the preview image of each of a plurality of screens including a first screen; receiving a first user input for modifying the background image of the first screen; modifying the background image of each of the plurality of screens by performing synchronization so as to apply a modification corresponding to the first user input to the background images of the plurality of screens; and displaying, on the first display, the preview image of each of the plurality of screens including the modified background image.

In the operation method of the electronic device according to various embodiments, the operation of modifying the background image may include: copying first input data corresponding to the first user input; and modifying the background image of each of the plurality of screens based on the copied input data.

In the operation method of the electronic device according to various embodiments, the operation of modifying the background images may include modifying the plurality of screens so as to include background images to which the modification is applied in response to reception of the first user input.

The operation method of the electronic device according to various embodiments may further include: receiving a second user input for selecting at least one application in order to set a background image; and modifying a background image of each of at least one screen included in the selected application based on the first user input.

The operation method of the electronic device according to various embodiments may further include: identifying the characteristics or type of a visual element included in a second screen among the plurality of screens; and modifying a part of the background image of the second screen, which corresponds to an area in which the visual element is disposed, based on the characteristics or type of the visual element.

In the operation method of the electronic device according to various embodiments, the plurality of screens may include a third screen to be displayed on the second display, and the operation method of the electronic device may further include modifying a background image of the third screen based on the first user input and a characteristics of the second display.

In the operation method of the electronic device according to various embodiments, the operation of modifying the background image of the third screen may include modifying the background image of the third screen by changing a resolution of the background image of the first screen.

In the operation method of the electronic device according to various embodiments, the second display is disposed in the electronic device, or is disposed in an external electronic device connected to the electronic device.

In the operation method of the electronic device according to various embodiments, the first user input is at least one user input among a user input for selecting an area to be displayed from the background image and a user input for enlarging or reducing the background image.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first display;
   a memory to store instructions; and
   at least one processor coupled to the memory,
   wherein the instructions, when executed by the at least one processor, cause the electronic device to:
      control the first display to display a preview image of each of a plurality of screens including a first screen,
      receive a first user input for modifying a background image of the first screen in an area in which the preview image corresponding to the first screen is displayed,
      modify a background image of each of the plurality of screens by synchronizing a modification corresponding to the first user input among background images of the plurality of screens, and
      control the first display to display the preview image of each of the plurality of screens including the modified background image of each of the plurality of screens.

2. The electronic device of claim 1, wherein the instructions, when executed by the at least one processor, cause the electronic device to:
   copy first input data corresponding to the first user input, and
   modify the background image of each of the plurality of screens, based on the copied first input data.

3. The electronic device of claim 1, wherein the instructions, when executed by the at least one processor, cause the electronic device to modify the plurality of screens to include background images to which the modification is applied in response to the reception of the first user input.

4. The electronic device of claim 1, wherein the instructions, when executed by the at least one processor, cause the electronic device to:
receive a second user input for selecting at least one application to set a background image, and
modify a background image of each of at least one screen included in the selected at least one application, based on the first user input.

5. The electronic device of claim 1, wherein the instructions, when executed by the at least one processor, cause the electronic device to:
identify at least one of a plurality of characteristics or a type of a visual element included in a second screen among the plurality of screens, and
modify a part of a background image of the second screen which corresponds to an area in which the visual element is disposed, based on the characteristics or the type of the visual element.

6. The electronic device of claim 1,
wherein the plurality of screens comprises a third screen to be displayed on a second display, and
wherein the instructions, when executed by the at least one processor, cause the electronic device to modify a background image of the third screen based on the first user input and characteristics of the second display.

7. The electronic device of claim 6, wherein the instructions, when executed by the at least one processor, cause the electronic device to modify the background image of the third screen by changing a resolution of the background image of the first screen.

8. The electronic device of claim 6, wherein the second display is disposed in at least one of the electronic device, or an external electronic device connected to the electronic device.

9. The electronic device of claim 1, wherein the instructions, when executed by the at least one processor, cause the electronic device to:
generate modification data corresponding to the first user input, and
generate background images of the plurality of screens, based on the background image of the first screen and the modification data.

10. The electronic device of claim 9, wherein the generated modification data comprises information indicating an area of the background image to be displayed on the first display.

11. The electronic device of claim 1, wherein the first user input comprises at least one of a user input for selecting an area to be displayed from the background image, or a user input for enlarging or reducing the background image.

12. A method of an electronic device, the method comprising:
displaying, on a first display, a preview image of each of a plurality of screens including a first screen;
receiving a first user input for modifying a background image of the first screen;
modifying a background image of each of the plurality of screens by synchronizing a modification corresponding to the first user input among background images of the plurality of screens; and
displaying, on the first display, the preview image of each of the plurality of screens including the modified background image of each of the plurality of screens.

13. The method of claim 12, wherein the modifying of the background image comprises:
copying first input data corresponding to the first user input, and
modifying the background image of each of the plurality of screens based on the copied first input data.

14. The method of claim 12, wherein the modifying of the background images comprises:
modifying the plurality of screens to include background images to which the modification is applied in response to the reception of the first user input.

15. The method of claim 12, further comprising:
receiving a second user input for selecting at least one application to set a background image; and
modifying a background image of each of at least one screen included in the selected at least one application, based on the first user input.

16. The method of claim 12, further comprising:
identifying at least one of a plurality of characteristics or a type of a visual element included in a second screen among the plurality of screens; and
modifying a part of a background image of the second screen which corresponds to an area in which the visual element is disposed, based on the characteristics or the type of the visual element.

17. The method of claim 12,
wherein the plurality of screens comprises a third screen to be displayed on a second display, and
wherein the method further comprises modifying a background image of the third screen based on the first user input and characteristics of the second display.

18. The method of claim 17, wherein the modifying of the background image of the third screen comprises modifying the background image of the third screen by changing a resolution of the background image of the first screen.

19. The method of claim 18, wherein the second display is disposed in at least one of the electronic device, or an external electronic device connected to the electronic device.

20. The method of claim 12, wherein the first user input comprises at least one user input of a user input for selecting an area to be displayed from the background image, or a user input for enlarging or reducing the background image.

* * * * *